(12) United States Patent
Uno

(10) Patent No.: US 9,383,542 B2
(45) Date of Patent: Jul. 5, 2016

(54) LENS BARREL

(71) Applicant: Panasonic Corporation, Osaka (JP)

(72) Inventor: Tetsuya Uno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/447,744

(22) Filed: Jul. 31, 2014

(65) Prior Publication Data

US 2014/0355133 A1    Dec. 4, 2014

Related U.S. Application Data

(63) Continuation of application No. PCT/JP2013/000592, filed on Feb. 1, 2013.

(30) Foreign Application Priority Data

Feb. 2, 2012   (JP) .................................. 2012-021374

(51) Int. Cl.
    *G02B 7/10*      (2006.01)
    *G03B 5/00*      (2006.01)
    *G03B 17/04*     (2006.01)

(52) U.S. Cl.
    CPC  *G02B 7/10* (2013.01); *G02B 7/102* (2013.01); *G03B 5/00* (2013.01); *G03B 17/04* (2013.01); *G03B 2205/0092* (2013.01)

(58) Field of Classification Search
    CPC ............ G02B 7/10; G02B 7/102; G03B 5/00; G03B 17/04; G03B 2205/0092
    USPC ........................................................ 359/700
    See application file for complete search history.

(56) References Cited

U.S. PATENT DOCUMENTS

| | | | |
|---|---|---|---|
| 5,486,889 | A  | 1/1996  | Shintani |
| 6,018,426 | A  | 1/2000  | Funahashi |
| 7,088,523 | B2 | 8/2006  | Hamasaki et al. |
| 7,102,831 | B2 | 9/2006  | Omiya et al. |
| 7,194,203 | B2 | 3/2007  | Omiya et al. |
| 7,265,913 | B2 | 9/2007  | Nagai et al. |
| 7,338,219 | B2 | 3/2008  | Ishizuka et al. |
| 7,454,129 | B2 | 11/2008 | Fukai |

(Continued)

FOREIGN PATENT DOCUMENTS

| | | | |
|---|---|---|---|
| JP | 63-138320 | A | 6/1986 |
| JP | 63-138320 | A | 6/1988 |

(Continued)

OTHER PUBLICATIONS

Notice of Allowance issued on Jan. 21, 2015 for U.S. Appl. No. 14/447,843.

(Continued)

*Primary Examiner* — Bumsuk Won
*Assistant Examiner* — Grant Gagnon
(74) *Attorney, Agent, or Firm* — Renner, Otto, Boisselle & Sklar, LLP

(57) ABSTRACT

With a lens barrel, the depth of a first cam groove is substantially the same as the depth of a second cam groove. The length of a first cam protrusion in a first direction is greater than the length of the second straight portion in the first direction. The length of a second cam protrusion in a second direction is greater than the length of a first straight portion in the second direction.

7 Claims, 22 Drawing Sheets

(56) References Cited

U.S. PATENT DOCUMENTS

| | | | |
|---|---|---|---|
| 7,455,465 B2 | 11/2008 | Nuno et al. |
| 7,477,308 B2 | 1/2009 | Omiya et al. |
| 7,492,536 B2 | 2/2009 | Nagai et al. |
| 7,507,040 B2 | 3/2009 | Nomura et al. |
| 7,515,182 B2 | 4/2009 | Omiya et al. |
| 7,515,195 B2 | 4/2009 | Endo et al. |
| 7,527,438 B2 | 5/2009 | Nomura et al. |
| 7,536,091 B2 | 5/2009 | Nomura |
| 7,689,110 B2 | 3/2010 | Yumiki et al. |
| 7,746,584 B2 | 6/2010 | Honsho et al. |
| 7,753,598 B2 | 7/2010 | Ishizuke et al. |
| 7,755,855 B2 | 7/2010 | Shimazaki et al. |
| 7,777,976 B2 | 8/2010 | Nomura et al. |
| 7,780,362 B2 | 8/2010 | Nomura et al. |
| 7,860,383 B2 | 12/2010 | Nomura et al. |
| 7,864,241 B2 | 1/2011 | Iwasaki |
| 7,920,345 B2 | 4/2011 | Honsho et al. |
| 8,041,204 B2 | 10/2011 | Nomura |
| 8,090,249 B2 | 1/2012 | Suzuka |
| 8,218,255 B2 | 7/2012 | Katano |
| 8,228,619 B2 | 7/2012 | Koyama |
| 8,351,775 B2 | 1/2013 | Nagae |
| 8,396,358 B2 | 3/2013 | Suzuka |
| 8,432,477 B2 | 4/2013 | Honsho et al. |
| 8,441,742 B2 | 5/2013 | Koyama |
| 8,451,544 B2 | 5/2013 | Suzuki |
| 8,498,528 B2 | 7/2013 | Suzuka |
| 8,665,535 B2 | 3/2014 | Shinano et al. |
| 8,730,600 B2 | 5/2014 | Iwasaki et al. |
| 8,773,762 B2 | 7/2014 | Suzuka |
| 8,776,615 B2 | 7/2014 | Kempainen et al. |
| 9,116,283 B2 | 8/2015 | Konishi |
| 2005/0207748 A1 | 9/2005 | Ishizuka et al. |
| 2006/0034001 A1* | 2/2006 | Nagai et al. ............. 359/694 |
| 2006/0034604 A1 | 2/2006 | Nomura et al. |
| 2006/0092526 A1 | 5/2006 | Hamasaki et al. |
| 2007/0253689 A1 | 11/2007 | Nagai et al. |
| 2008/0180812 A1 | 7/2008 | Honsho et al. |
| 2009/0207509 A1* | 8/2009 | Nomura et al. ............. 359/813 |
| 2009/0231709 A1 | 9/2009 | Nomura et al. |
| 2010/0067896 A1 | 3/2010 | Murakami |
| 2010/0142939 A1 | 6/2010 | Honsho et al. |
| 2011/0001872 A1 | 1/2011 | Honsho et al. |
| 2011/0013897 A1 | 1/2011 | Nagae |
| 2011/0019290 A1* | 1/2011 | Shinano et al. ............. 359/700 |
| 2011/0026143 A1 | 2/2011 | Katano |
| 2011/0032627 A1 | 2/2011 | Koyama |
| 2011/0141566 A1 | 6/2011 | Suzuka |
| 2012/0045198 A1 | 2/2012 | Miyoshi et al. |
| 2012/0070138 A1 | 3/2012 | Onishi |
| 2012/0257286 A1 | 10/2012 | Koyama |
| 2013/0215316 A1 | 8/2013 | Honsho et al. |
| 2014/0340751 A1 | 11/2014 | Konishi et al. |
| 2014/0340754 A1 | 11/2014 | Uno et al. |
| 2014/0340772 A1 | 11/2014 | Shinano |

FOREIGN PATENT DOCUMENTS

| | | |
|---|---|---|
| JP | 05-090416 | 12/1993 |
| JP | 06-034865 A | 2/1994 |
| JP | 06-051178 | 2/1994 |
| JP | 08-152659 A | 6/1996 |
| JP | 10-003103 A | 1/1998 |
| JP | 11-160606 A | 6/1999 |
| JP | 2000-292848 | 10/2000 |
| JP | 2001-042189 | 2/2001 |
| JP | 2001-235670 | 8/2001 |
| JP | 2003-315861 A | 11/2003 |
| JP | 2004-233916 A | 8/2004 |
| JP | 2005-172953 A | 6/2005 |
| JP | 2005-227597 A | 8/2005 |
| JP | 2005-266345 A | 9/2005 |
| JP | 2006-053444 | 2/2006 |
| JP | 2006-053445 A | 2/2006 |
| JP | 2006-058455 A | 3/2006 |
| JP | 2006-126537 A | 5/2006 |
| JP | 2006-330657 A | 12/2006 |
| JP | 2007-163961 A | 6/2007 |
| JP | 2007-178751 | 7/2007 |
| JP | 2007-199320 | 8/2007 |
| JP | 2007-206210 A | 8/2007 |
| JP | 2008-015387 A | 1/2008 |
| JP | 2008-046504 A | 2/2008 |
| JP | 2008-139802 | 6/2008 |
| JP | 2008-158288 A | 7/2008 |
| JP | 2008-185786 A | 8/2008 |
| JP | 2009-157245 A | 7/2009 |
| JP | 2009-216881 A | 9/2009 |
| JP | 2009-217243 A | 9/2009 |
| JP | 2009-244874 A | 10/2009 |
| JP | 2009-251063 | 10/2009 |
| JP | 2009-251064 A | 10/2009 |
| JP | 2010-026163 A | 2/2010 |
| JP | 2010-164695 A | 7/2010 |
| JP | 2010-217511 A | 9/2010 |
| JP | 2011-013613 B | 1/2011 |
| JP | 2011-022234 A | 2/2011 |
| JP | 2011-033667 A | 2/2011 |
| JP | 2011-039090 A | 2/2011 |
| JP | 2011-039527 A | 2/2011 |
| JP | 2011-048346 A | 3/2011 |
| JP | 2011-150132 A | 8/2011 |
| JP | 2011-154204 | 8/2011 |
| JP | 2011-158592 A | 8/2011 |
| JP | 2011-170262 A | 9/2011 |
| JP | 2011-209348 A | 10/2011 |
| JP | 2011-209652 A | 10/2011 |
| JP | 2011-215389 | 10/2011 |
| JP | 2012-018325 A | 1/2012 |

OTHER PUBLICATIONS

Notice of Allowance issued on Jan. 26, 2015 for U.S. Appl. No. 14/447,791.
Office Action issued on Feb. 20, 2015 for U.S. Appl. No. 14/447,907.
International Search Report for corresponding International Application No. PCT/JP2013/000592 mailed Mar. 5, 2013.
International Search Report for related International Application No. PCT/JP2013/000586 mailed May 7, 2013.
International Search Report for related International Application No. PCT/JP2013/000588 mailed May 7, 2013.
International Search Report for related International Application No. PCT/JP2013/000589 mailed May 7, 2013.
International Search Report for related International Application No. PCT/JP2013/000595 mailed May 7, 2013.
International Search Report for related International Application No. PCT/JP2012/008448 mailed Feb. 12, 2013.
International Search Report for related International Application No. PCT/JP2013/000594 mailed Mar. 12, 2013.
Co-pending U.S. Appl. No. 14/447,791, filed Jul. 31, 2014.
Co-pending U.S. Appl. No. 14/447,871, filed Jul. 31, 2014.
Co-pending U.S. Appl. No. 14/447,843, filed Jul. 31, 2014.
Co-pending U.S. Appl. No. 14/447,907, filed Jul. 31, 2014.
Co-pending U.S. Appl. No. 14/448,069, filed Jul. 31, 2014.
Co-pending U.S. Appl. No. 14/448,112, filed Jul. 31, 2014.
Office Action issued on Mar. 12, 2015 for Co-Pending U.S. Appl. No. 14/448,112.
Office Action issued on Aug. 27, 2015 for Co-Pending U.S. Appl. No. 14/448,112.
Office Action issued on Dec. 22, 2015 for Co-Pending U.S. Appl. No. 14/447,871.

* cited by examiner

LENS BARREL

CROSS-REFERENCE TO RELATED APPLICATIONS

This is a continuation application of International Application PCT/JP2013/000592, with an international filing date of Feb. 1, 2013 which claims priority to Japanese Patent Application No. 2012-021374 filed on Feb. 2, 2012. The entire disclosures of International Application PCT/JP2013/000592 and Japanese Patent Application No. 2012-021374 are hereby incorporated herein by reference.

BACKGROUND

Technical Field

The technology disclosed herein relates to a lens barrel comprising an optical system.

Lens barrels in which a first rotary frame, a first rectilinear frame, a second rectilinear frame, and a second rotary frame are disposed inside a stationary frame in that order starting from the outside have been known in the past (see Japanese Laid-Open Patent Application 2011-13613, for example).

With the lens barrel discussed in Japanese Laid-Open Patent Application 2011-13613, a cam mechanism is formed between a rotary cam frame and each of a second lens frame and a third lens frame. Specifically, two kinds of cam groove are formed in the inner peripheral face of the rotary cam frame. However, the two kinds of cam grooves are formed so as not to intersect each other in order to maintain the smooth drive of the cam protrusions had by the second lens frame and third lens frame. A problem with this configuration was that there was little latitude in the design of the two kinds of cam groove.

The technology disclosed herein was conceived in light of the above situation, and it is an object thereof to provide a lens barrel that affords greater latitude in the design of a cam groove.

SUMMARY

The lens barrel disclosed herein comprises a first frame, a second frame, and a third frame.

The first frame includes at least one first cam groove and at least one second cam groove. At least one the first cam groove is provided along a cylindrical face. At least one the first cam groove includes a first straight portion. The first straight portion is formed in a first direction in a state in which the cylindrical face is spread out in a plane. At least one second cam groove is provided along the cylindrical face. At least one second cam groove is formed in a second direction that intersects the first direction in a state in which the cylindrical face is spread out in a plane. At least one second cam groove includes a second straight portion that intersects the first straight portion.

The second frame includes at least one first cam protrusion. At least one first cam protrusion is configured to engage with the first cam groove. The third frame includes at least one second cam protrusion. At least one second cam protrusion is configured to engage with the second cam groove.

The depth of the first cam groove is substantially the same as the depth of the second cam groove. The length of the first cam protrusion in the first direction is greater than the length of the second straight portion in the first direction. The length of the second cam protrusion in the second direction is greater than the length of the first straight portion in the second direction.

With the technology disclosed herein provides a lens barrel that affords greater latitude in the design of a cam groove.

BRIEF DESCRIPTION OF DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

An embodiment of the present technology will be described through reference to the drawings. In the description of the drawings that follows, portions that are the same or similar will be numbered the same or similarly. The drawings are merely schematic representations, however, and the proportions of the various dimensions and so forth may be different from those in actuality. Therefore, the specific dimensions and so forth should be determined by referring to the following description. Also, the mutual dimensional relations and proportions among the drawings may, of course, vary in some portions.

In the following embodiment, a digital camera will be described as an example of an imaging device. In the following description, assuming that the digital camera is in its landscape orientation, the subject side will be referred to as the "front," the opposite side from the subject as the "rear," vertically upward as "upward," vertically downward as "downward," the right side when facing the subject as "right," and the left side when facing the subject as "left." "Landscape orientation" is a kind of orientation of a digital camera, and when an image is captured in landscape orientation, the long-side direction of a rectangular image that is wider than it is tall substantially coincides with the horizontal direction within the image.

Configuration of Digital Camera 1

Figure 1:
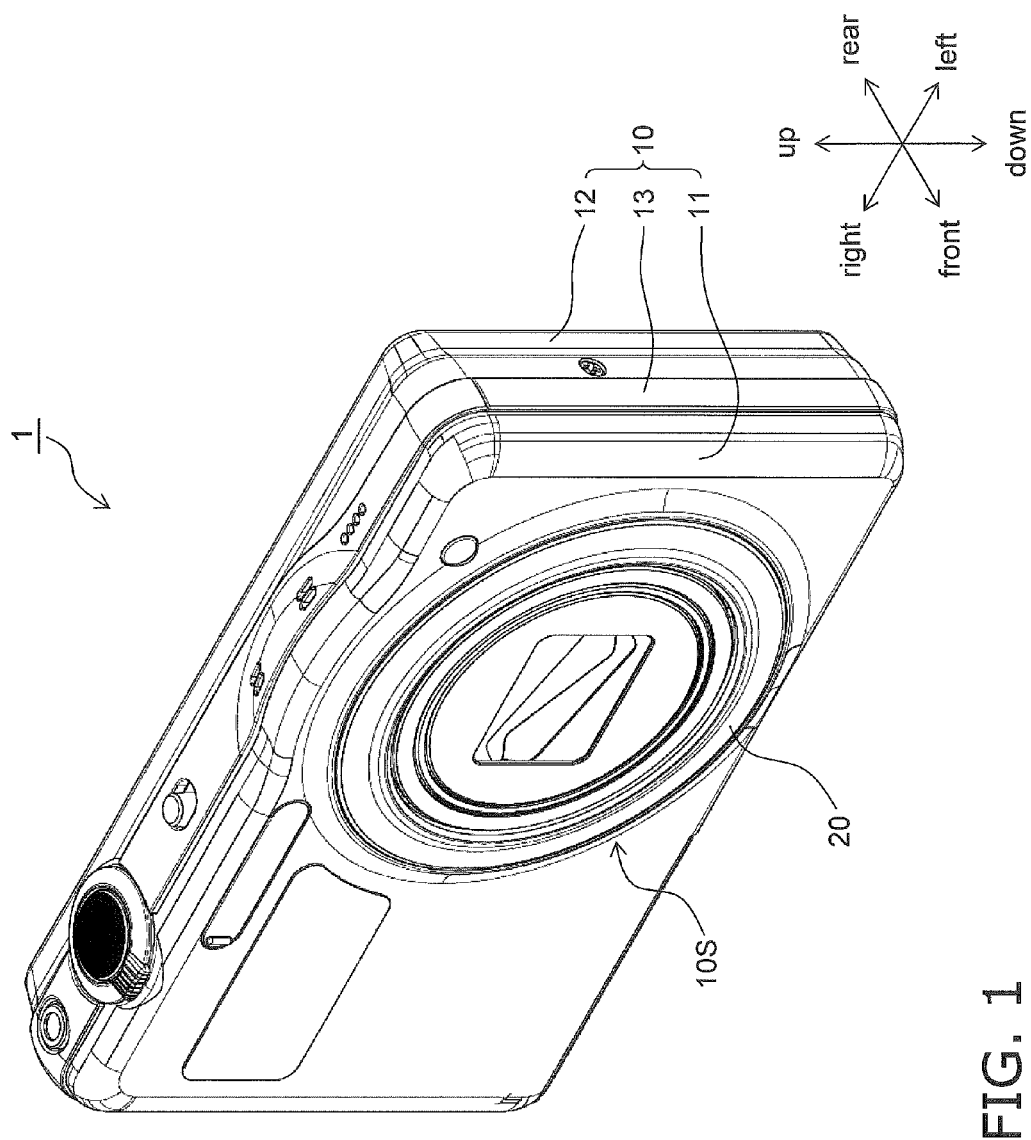
FIG. 1 is an oblique view of a digital camera.
Figure 2:
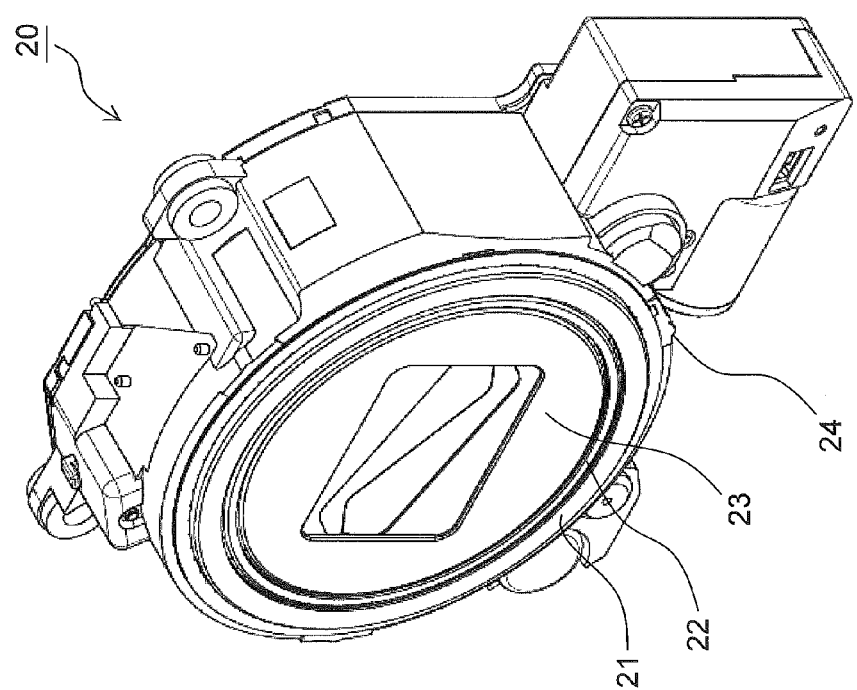
FIG. 2 is an oblique view of a lens barrel.

The configuration of a digital camera 1 will be described through reference to the drawings. FIG. 1 is an oblique view of the digital camera 1. FIG. 2 is an oblique view of a lens barrel 20.

As shown in FIG. 1, the digital camera 1 comprises a housing 10 and the lens barrel 20.

The housing 10 is made up of a front panel 11, a rear panel 12, and side panels 13. An opening 10S is formed in the front panel 11.

The lens barrel 20 comprises a three-stage retractable zoom mechanism. The lens barrel 20 is housed in the housing 10 when not being used for imaging, and is deployed forward from the opening 10S during imaging. More specifically, as shown in FIG. 2, the lens barrel 20 has a first movable lens barrel portion 21, a second movable lens barrel portion 22, a third movable lens barrel portion 23, and a stationary lens barrel 24.

The first movable lens barrel portion 21 can be deployed with respect to the stationary lens barrel 24. The second movable lens barrel portion 22 can be deployed with respect to the first movable lens barrel 21. The third movable lens barrel portion 23 can be deployed with respect to the second movable lens barrel 22. The stationary lens barrel 24 is fixed inside the housing 10. When the lens barrel 20 is deployed, the third movable lens barrel portion 23 is located the farthest forward of the first to third movable lens barrel portions 21 to 23.

Detailed Configuration of Lens Barrel 20

Figure 3:
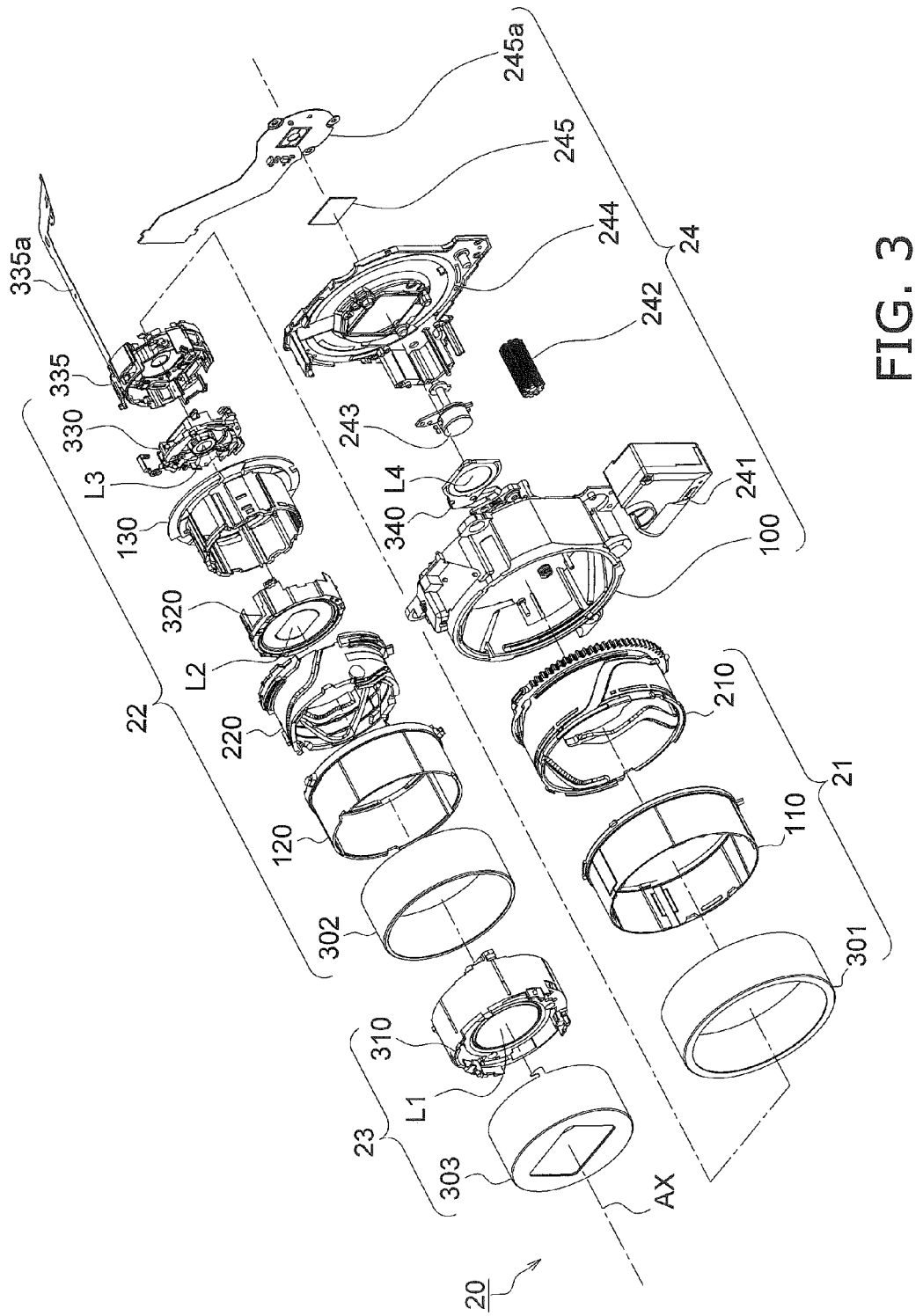
FIG. 3 is an exploded oblique view of a lens barrel.

Next, the detailed configuration of the lens barrel 20 will be described through reference to the drawings. FIG. 3 is an exploded oblique view of the lens barrel 20.

The first to third movable lens barrel portions 21 to 23 of the lens barrel 20 are deployed from the stationary lens barrel 24 along the optical axis AX of the optical system. The optical system includes first to fourth lens groups L1 to L4. In the following description, a direction parallel to the optical axis AX shall be referred to as the "optical axis direction," a direction perpendicular to the optical axis direction as the "radial direction," and a direction that goes in a circle around the optical axis AX as the "peripheral direction." The optical axis AX substantially coincides with the axis of the frames that make up the lens barrel 20.

In this embodiment, the term "rectilinear frame" means a frame that moves in the optical axis direction, without rotating in the peripheral direction. A "rotary frame" means a frame that rotates in the peripheral direction. The term "rotary frame" encompasses the meaning of both a frame that moves in the optical axis direction and a frame that does not move in the optical axis direction. The term "rectilinear groove" means a groove provided along the optical axis direction. A "rectilinear groove" is provided to both rectilinear and rotary frames.

The term "rectilinear" means moving in the optical axis direction, and not rotating in the peripheral direction. The term "rotary" means rotating in the peripheral direction. The term "rotary" is used in the meaning of both moving in the optical axis direction and not moving in the optical axis direction. The term "move" is a concept that also encompasses moving in the optical axis direction while rotating in the peripheral direction.

The term "bayonet" or "bayonet mechanism" means a mechanism in which frames including a "bayonet protrusion" and a "bayonet groove" provided in the peripheral direction are rotatably engaged, and a mechanism in which these frames are integrally engaged in the optical axis direction.

1. First Movable Lens Barrel Component 21

The first movable lens barrel portion 21 has a first rectilinear frame 110, a first rotary frame 210, and a first cosmetic frame 301. The first rectilinear frame 110 is a cylindrical plastic member disposed on the inside in the radial direction of a stationary frame 100 (discussed below). The first rotary frame 210 is a cylindrical plastic member disposed on the inside in the radial direction of the first rectilinear frame 110. The first cosmetic frame 301 is a cylindrical sheet metal member that covers the outer periphery of the first rectilinear frame 110.

2. Second Movable Lens Barrel Component 22

The second movable lens barrel portion 22 has a second rectilinear frame 120, a second rotary frame 220, a third rectilinear frame 130, a second lens group frame 320, a second lens group L2, a third lens group frame 330, a third lens group L3, a shutter frame 335, and a second cosmetic frame 302.

The second rectilinear frame 120 is a cylindrical plastic member disposed on the inside in the radial direction of the first rotary frame 210. The second rotary frame 220 is a cylindrical plastic member disposed on the inside in the radial direction of the second rectilinear frame 120. The third rectilinear frame 130 is a cylindrical plastic member disposed on the inside in the radial direction of the second rotary frame 220. The second lens group frame 320 is disposed on the inside in the radial direction of the third rectilinear frame 130, and supports the second lens group L2 used for zooming. The third lens group frame 330 is housed in the shutter frame 335, and supports the third lens group L3 used for image blur correction. The third lens group frame 330 is supported rotatably in the radial direction by the shutter frame 335, and constitutes an image blur correction mechanism along with the third lens group L3. The shutter frame 335 is disposed on the inside in the radial direction of the third rectilinear frame 130, and has a built-in shutter mechanism. The shutter frame 335 supports the third lens group frame 330 pivotably in the radial direction. A control-use flexible wire 335a is connected to the shutter frame 335. The control-use flexible wire 335a is disposed along the inner peripheral face of the stationary frame 100, and is connected to a control device (not shown). The control-use flexible wire 335a transmits control signals to the shutter mechanism and the image blur correction mechanism (discussed below). The second cosmetic frame 302 is a cylindrical sheet metal member that covers the outer periphery of the second rectilinear frame 120.

3. Third Movable Lens Barrel Component 23

The third movable lens barrel portion 23 has a first lens group frame 310, a first lens group L1, and a third cosmetic frame 303.

The first lens group frame 310 is disposed between the second rectilinear frame 120 and the second rotary frame 220. The first lens group frame 310 supports the first lens group L1, which is used to bring light into the lens barrel 20. The third cosmetic frame 303 is a cylindrical sheet metal member that covers the outer periphery of the first lens group frame 310.

4. Stationary Lens Barrel 24

The stationary lens barrel 24 has the stationary frame 100, a fourth lens group frame 340, a fourth lens group L4, a zoom motor 241, a zoom gear 242, a focus motor 243, a master flange 244, an imaging element 245, and an imaging element flexible wire 245a.

The stationary frame 100 is a cylindrical plastic member disposed on the outside in the radial direction of the first rotary frame 210 and the first rectilinear frame 110. The fourth lens group frame 340 is attached to the master flange 244, and is driven in the optical axis direction by the focus motor 243. The fourth lens group frame 340 supports the fourth lens group L4, which is used for focal adjustment.

The zoom motor 241 is a drive source that is used to deploy the first to third movable lens barrel portions 21 to 23, and is attached to the side face of the stationary frame 100. The zoom gear 242 transmits the drive force of the zoom motor 241 to the first rotary frame 210. The front end of the zoom gear 242 is supported by the stationary frame 100, and the rear end of the zoom gear 242 is supported by the master flange 244. The focus motor 243 is a drive source that is used to drive the fourth lens group frame 340 in the optical axis direction, and is attached to the master flange 244. The master flange 244 is a flat plastic member that covers the rear of the stationary frame 100. The imaging element 245 is fitted into the center of the master flange 244. In a state in which the imaging element flexible wire 245a and the imaging element 245 have been electrically connected, the imaging element flexible wire 245a is affixed to the rear face of the master flange 244. The imaging element flexible wire 245a is connected to a control device (not shown), and transmits signals from the imaging element 245.

Configuration of Frames

The frames that make up the lens barrel 20 will now be described through reference to the drawings. More specifically, the configurations of the stationary frame 100, the first rectilinear frame 110, the first rotary frame 210, the second rectilinear frame 120, the second rotary frame 220, the third rectilinear frame 130, the first lens group frame 310, the second lens group frame 320, the third lens group frame 330, and the shutter frame 335 will be described in order, after which we will describe how the frames are engaged with each other.

1. Configuration of Stationary Frame 100

Figure 4:
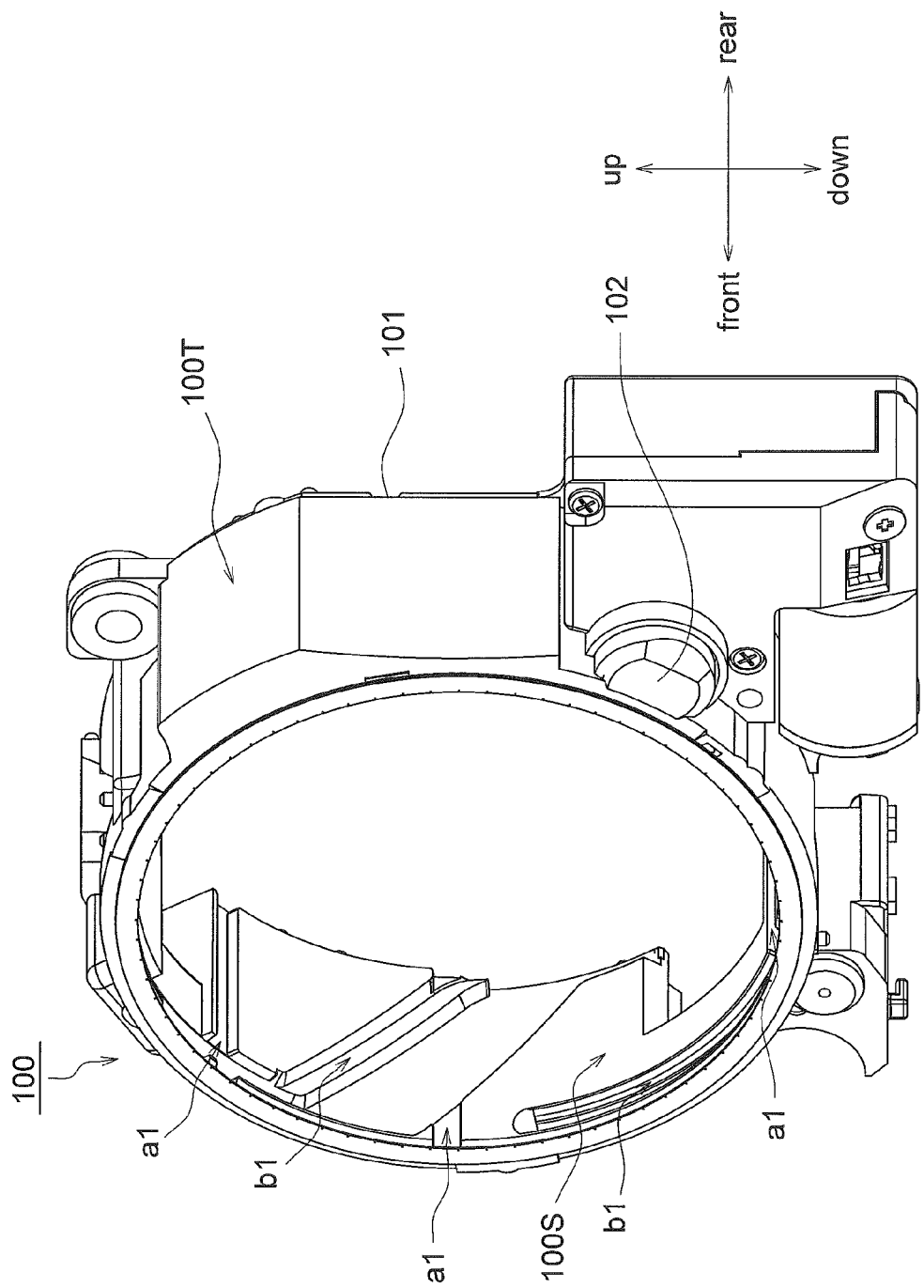
FIG. 4 is an oblique view of a stationary frame.

FIG. 4 is an oblique view of the stationary frame 100. The stationary frame 100 has a stationary frame main body 101 and a zoom gear support 102.

The stationary frame main body 101 is formed in a cylindrical shape, and has an inner peripheral face 100S and an outer peripheral face 100T.

The zoom gear support 102 is provided so as to protrude from the outer peripheral face 100T. The zoom gear support 102 rotatably supports the front end of the zoom gear 242. In this embodiment, the zoom gear support 102 is covered by the front panel 11, so it is not exposed on the outside of the housing 10 (see FIG. 1). The teeth of the zoom gear 242 protrude on the inside of the stationary frame main body 101.

The stationary frame 100 has five rectilinear grooves a1 and three cam grooves b1. In FIG. 4, however, only three rectilinear grooves a1 and two cam grooves b1 are shown. The five rectilinear grooves a1 are formed in the inner peripheral face 100S in the optical axis direction, and are suitably spaced apart in the peripheral direction.

The three cam grooves b1 are formed in the inner peripheral face 100S so as to intersect the optical axis direction.

2. Configuration of First Rectilinear Frame 110

Figure 5:
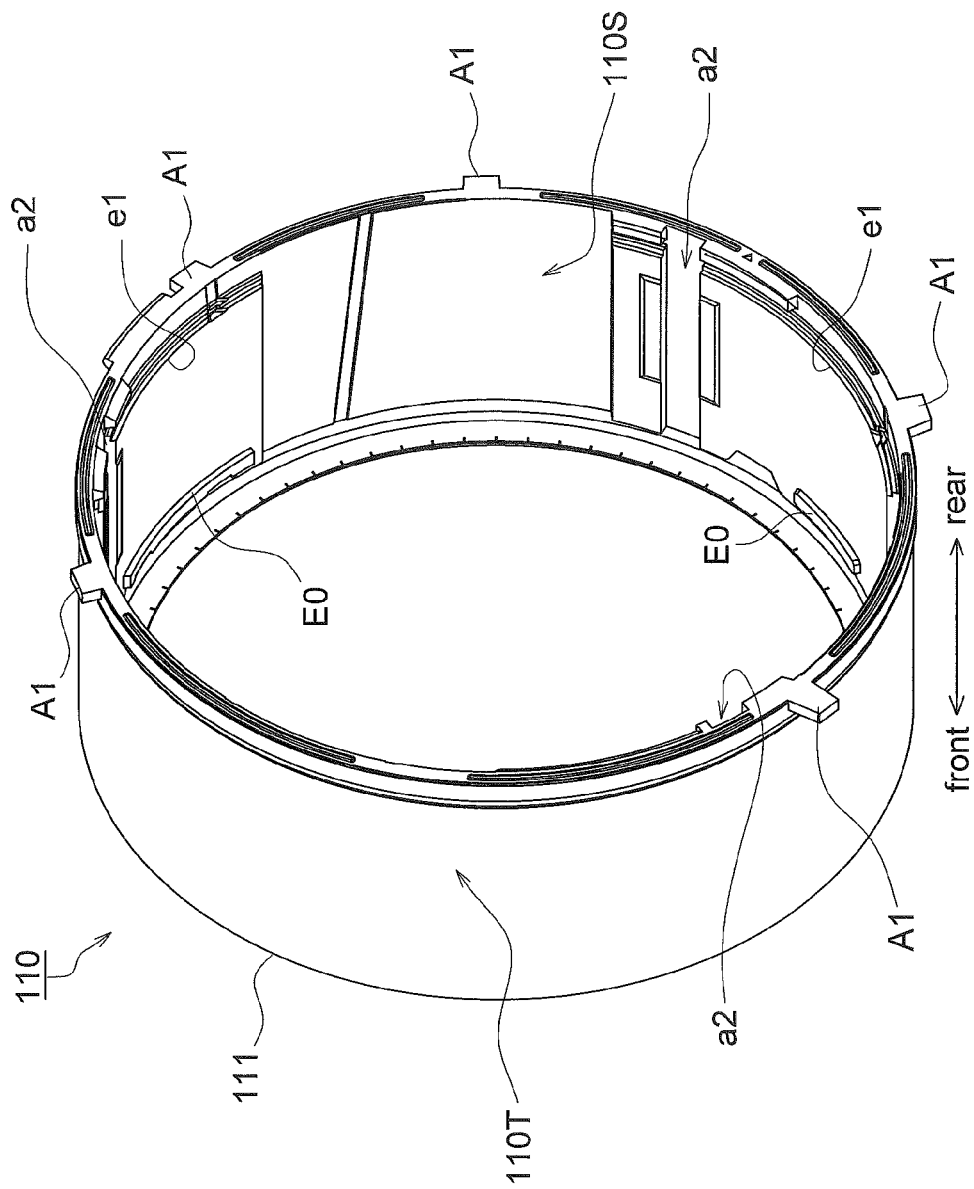
FIG. 5 is an oblique view of a first rectilinear frame.

FIG. 5 is an oblique view of the first rectilinear frame 110. The first rectilinear frame 110 has a first rectilinear frame main body 111, five rectilinear protrusions A1, three rectilinear grooves a2, a bayonet groove e1, and a bayonet protrusion E0.

The rectilinear frame main body 111 is formed in a cylindrical shape, and has an inner peripheral face 110S and an outer peripheral face 110T.

The five rectilinear protrusions A1 are provided at the rear end of the outer peripheral face 110T. The five rectilinear protrusions A1 are engaged with the five rectilinear grooves a1 of the stationary frame 100.

The three rectilinear grooves a2 are formed in the inner peripheral face 110S in the optical axis direction.

The bayonet groove e1 is formed in an arc shape in the peripheral direction at the rear end of the inner peripheral face 110S. The bayonet groove e1 intersects the three rectilinear grooves a2.

The bayonet protrusion E0 is disposed at the front end of the inner peripheral face 110S. The bayonet protrusion E0 is formed in an arc shape in the peripheral direction. In this embodiment, a plurality of bayonet protrusions E0 are provided in the peripheral direction.

3. Configuration of First Rotary Frame 210

Figure 6:
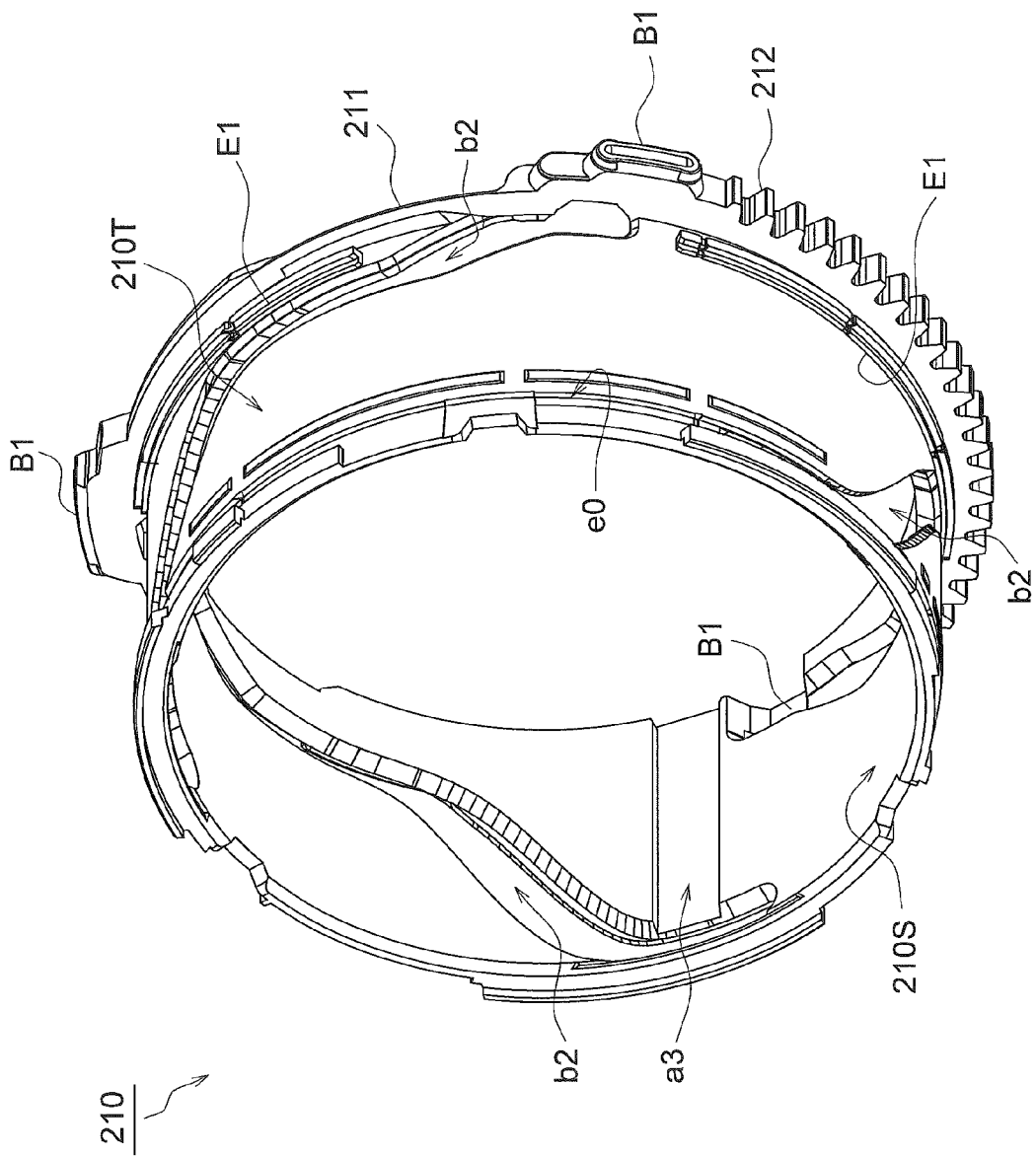
FIG. 6 is an oblique view of a first rotary frame.

FIG. 6 is an oblique view of the first rotary frame 210. The first rotary frame 210 has a first rotary frame main body 211 and a gear portion 212.

The first rotary frame main body 211 is formed in a cylindrical shape, and has an inner peripheral face 210S and an outer peripheral face 210T.

The gear portion 212 is provided to the rear end of the outer peripheral face 210T, and is formed in the peripheral direction. When the gear portion 212 meshes with the zoom gear 242, the first rotary frame 210 is rotated in the peripheral direction by the drive force of the zoom motor 241. Although not depicted, the gear portion 212 is disposed further to the rear than the rectilinear protrusions A1 of the first rectilinear frame 110.

The first rotary frame 210 has three cam followers B1, three bayonet protrusions E1, three cam grooves b2, a bayonet groove e0, and three rectilinear grooves a3. In FIG. 6, however, only one of the rectilinear grooves a3 is shown.

The three cam followers B1 are provided to the rear end of the outer peripheral face 210T. Two of the three cam followers B1 are disposed at the two ends of the gear portion 212. The three cam followers B1 are engaged with the cam grooves b1 of the stationary frame 100.

The bayonet protrusions E1 are formed in the peripheral direction at the rear end of the outer peripheral face 210T. The bayonet protrusions E1 are disposed in front of the gear portion 212. The bayonet protrusions E1 are engaged with the bayonet groove e1 of the first rectilinear frame 110. In this embodiment, the bayonet protrusions E1 and the bayonet groove e1 constitute a bayonet mechanism for rotatably engaging the first rotary frame 210 in the first rectilinear frame 110, and integrally engaging these in the optical axis direction.

The three cam grooves b2 pass through the first rotary frame main body 211 from the inner peripheral face 210S to the outer peripheral face 210T.

The bayonet groove e0 is formed at the front end of the outer peripheral face 210T. The bayonet groove e0 is formed in an arc shape in the peripheral direction. The bayonet groove e0 intersects the three cam grooves b2. The bayonet protrusion E0 is engaged with the bayonet groove e0.

The three rectilinear grooves a3 are formed in the inner peripheral face 210S in the optical axis direction. Two of the three rectilinear grooves a3 are close together, and are formed from 120° to 180° away from the other one.

4. Configuration of Second Rectilinear Frame 120

Figure 7:
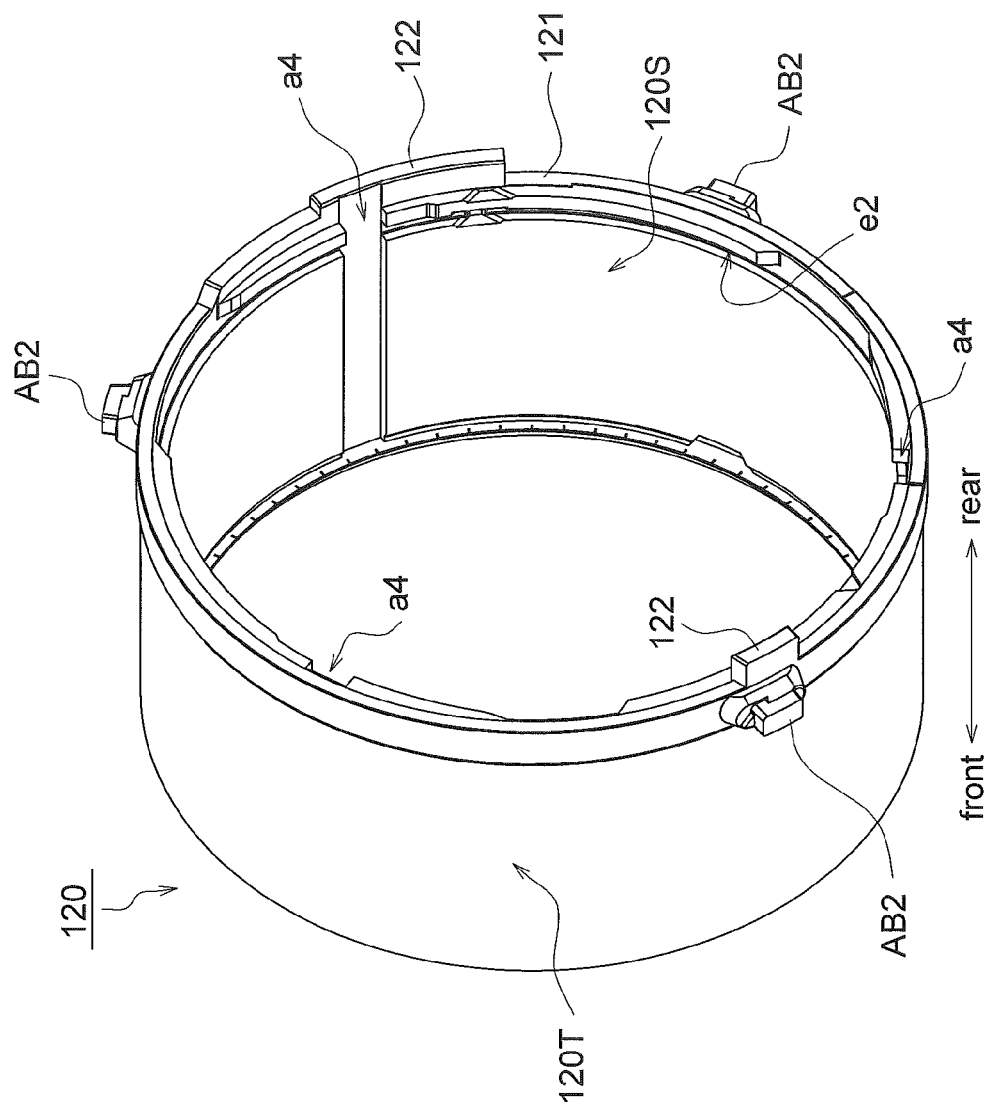
FIG. 7 is an oblique view of a second rectilinear frame.

FIG. 7 is an oblique view of the second rectilinear frame 120. The second rectilinear frame 120 has a second rectilinear frame main body 121 and two latching portions 122.

The second rectilinear frame main body 121 is formed in a cylindrical shape, and has an inner peripheral face 120S and an outer peripheral face 120T.

The two latching portions 122 are provided on the rear end face of the second rectilinear frame main body 121, and protrude toward the rear. The two latching portions 122 are formed at substantially symmetrical positions around the optical axis AX (see FIG. 3), that is, at positions that are separated by 120° to 180°. As will be discussed below, when the two latching portions 122 are latched to the third rectilinear frame 130, the relative rotation of the third rectilinear frame 130 with respect to the second rectilinear frame 120 is checked. In this embodiment, one of the two latching portions 122 is formed longer in the peripheral direction than the other one.

The second rectilinear frame 120 has three rectilinear cam followers AB2, three rectilinear grooves a4, and a bayonet groove e2.

The three rectilinear cam followers AB2 are provided at the rear end of the outer peripheral face 120T, and are disposed at a substantially constant pitch in the peripheral direction. The three rectilinear cam followers AB2 are engaged with the three cam grooves b2 of the first rotary frame 210. Also, the three rectilinear cam followers AB2 pass through the three cam grooves b2 and are engaged with the three rectilinear grooves a2 of the first rectilinear frame 110.

The three rectilinear grooves a4 are formed in the inner peripheral face 120S in the optical axis direction. The three rectilinear grooves a4 are disposed at a substantially constant pitch in the peripheral direction.

The bayonet groove e2 are formed at the rear end of the inner peripheral face 120S. The bayonet groove e2 intersects the three rectilinear grooves a4.

5. Configuration of Second Rotary Frame 220

Figure 8:
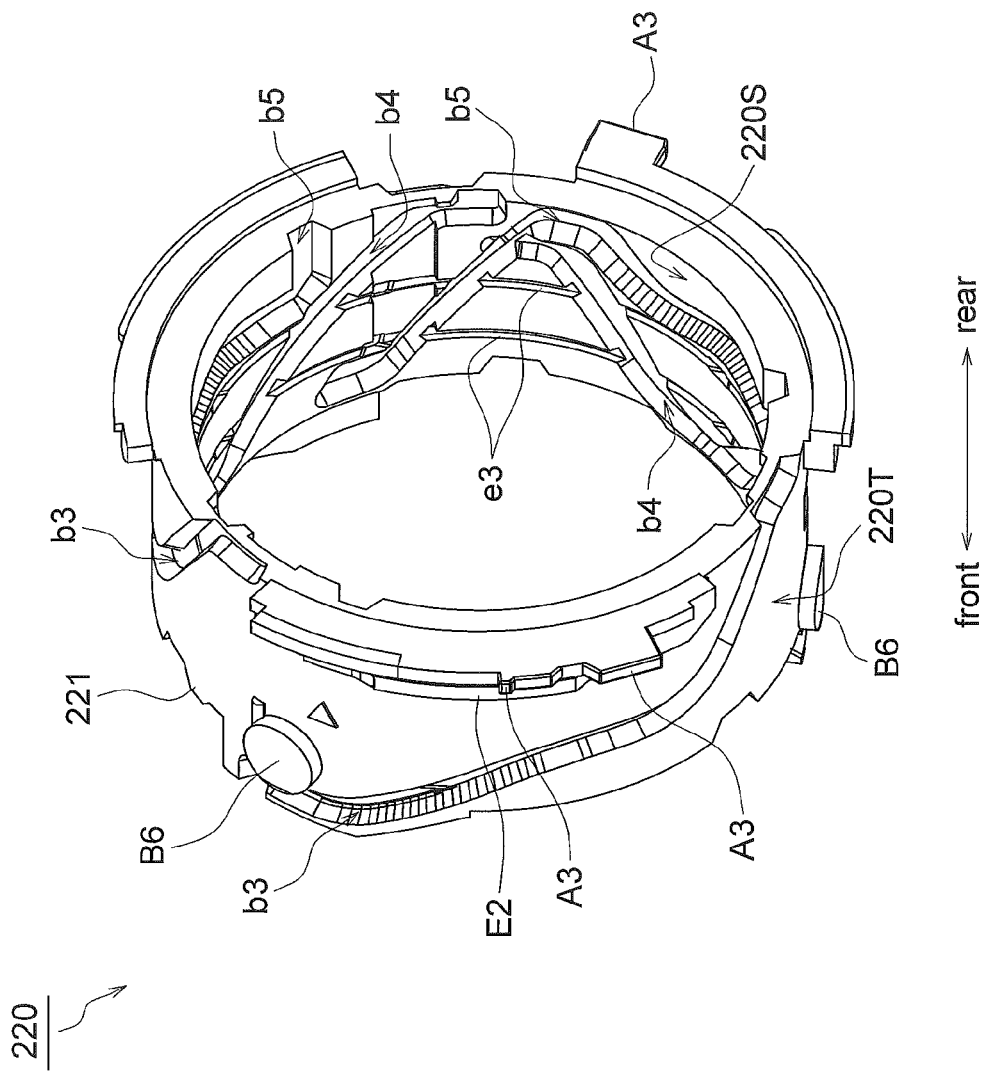
FIG. 8 is an oblique view of a second rotary frame.

FIG. 8 is an oblique view of the second rotary frame 220. The second rotary frame 220 has a second rotary frame main body 221, three rectilinear protrusions A3, three bayonet protrusions E2, two bayonet grooves e3, three cam grooves b3, three cam grooves b4, three cam grooves b5, and three cam followers B6. In FIG. 8, however, only two each of the cam grooves b3, the cam grooves b4, and the cam grooves b5 are shown.

The second rotary frame main body 221 is formed in a cylindrical shape, and has an inner peripheral face 220S and an outer peripheral face 220T.

The three rectilinear protrusions A3 are provided at the rear end of the outer peripheral face 220T, two of the three rectilinear protrusions A3 are close together in the peripheral direction, and the other one is separated by about 120° or more from the two rectilinear protrusions A3 that are close together. The three rectilinear protrusions A3 are engaged with the three rectilinear grooves a3 of the first rotary frame 210.

The three bayonet protrusions E2 are formed in the peripheral direction at the rear end of the outer peripheral face 220T. The three bayonet protrusions E2 are disposed in front of the three rectilinear protrusions A3. The bayonet protrusions E2 are engaged with the bayonet groove e2 of the second rectilinear frame 120. In this embodiment, the bayonet protrusions E2 and the bayonet groove e2 constitute a bayonet mechanism for engaging the second rotary frame 220 rotatably with the second rectilinear frame 120 and integrally in the optical axis direction.

The shape of the bayonet grooves e3 in a cross section including the optical axis is a trapezoidal shape in which the side on the outside in the radial direction is shorter, and the side on the inside in the radial direction is longer, and the bayonet grooves e3 are formed in the approximate center of the inner peripheral face 220S in the peripheral direction. The two bayonet grooves e3 are formed parallel to each other. The two bayonet grooves e3 intersect with the cam grooves b4 and the cam grooves b5. The radial direction depth of the two bayonet grooves e3 is shallower than the radial direction depth of the cam grooves b4 and the cam grooves b5.

The three cam grooves b3 are formed in the outer peripheral face 220T so as to intersect with the optical axis direction, and are disposed at a substantially constant pitch in the peripheral direction.

The cam grooves b4 and the cam grooves b5 are formed in the inner peripheral face 220S. The cam grooves b4 and the cam grooves b5 intersect each other. The cam grooves b4 and the cam grooves b5 are all formed in substantially the same depth. The configuration of the cam grooves b4 and the cam grooves b5 will be discussed in detail below.

The three cam followers B6 are provided to the front end of the outer peripheral face 220T, and are disposed at a substantially constant pitch in the peripheral direction. In FIG. 8, only two of the cam followers B6 are shown.

6. Configuration of Third Rectilinear Frame 130

Figure 9:
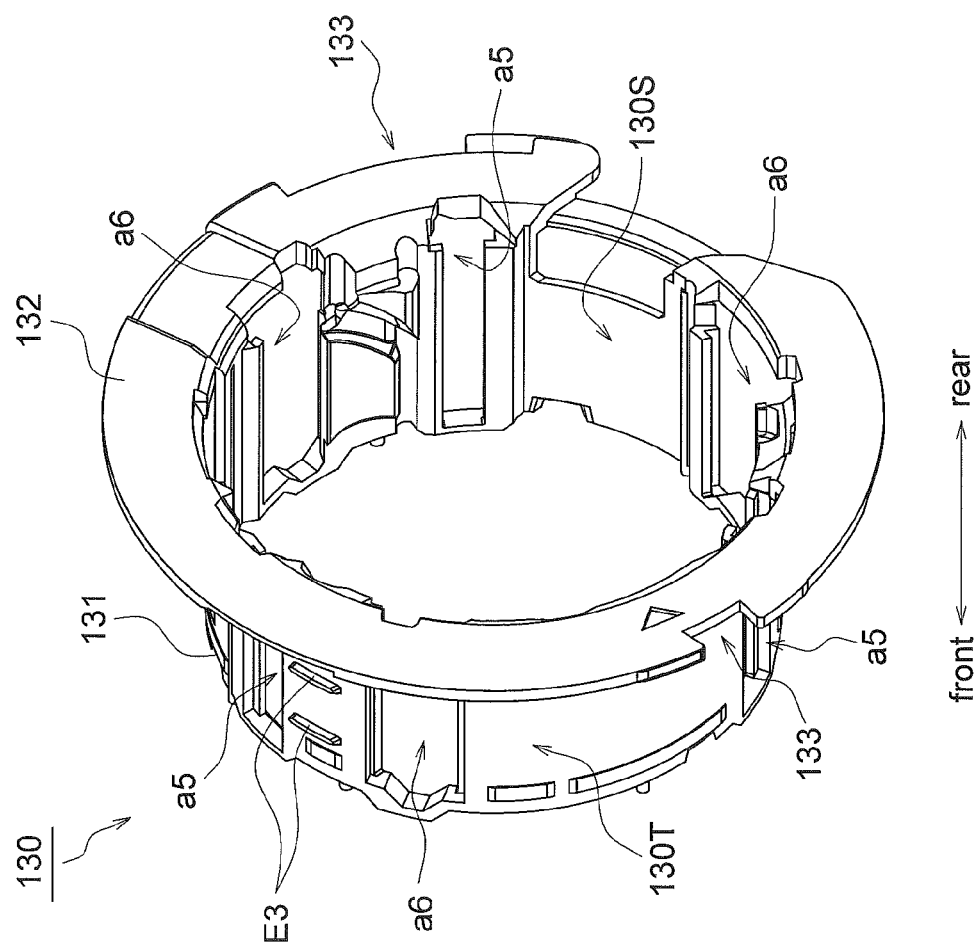
FIG. 9 is an oblique view of a third rectilinear frame.

FIG. 9 is an oblique view of the third rectilinear frame 130. The third rectilinear frame 130 has a third rectilinear frame main body 131, a flange 132, and two latching recesses 133.

The third rectilinear frame main body 131 is formed in a cylindrical shape, and has an inner peripheral face 130S and an outer peripheral face 130T.

The flange 132 is formed in an annular shape, and is provided on the rear end of the outer peripheral face 130T.

Figure 10:
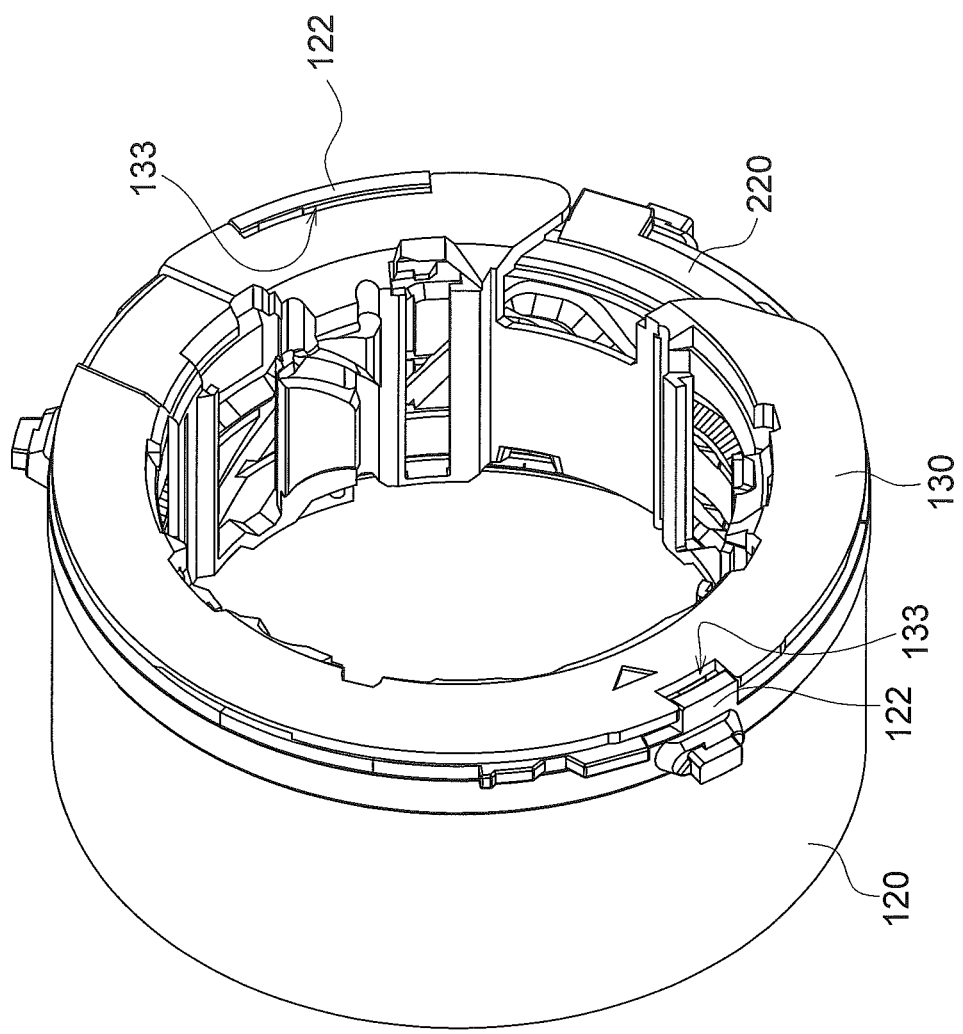
FIG. 10 is a schematic diagram in which the second rectilinear frame, the second rotary frame, and the third rectilinear frame have been put together.

The two latching recesses 133 are cut-outs formed in the outer edge of the flange 132. The two latching recesses 133 are formed in substantially symmetrical positions around the optical axis AX (see FIG. 3), that is, at positions separated by 120° to 180°. FIG. 10 is a schematic diagram in which the second rectilinear frame 120, the second rotary frame 220, and the third rectilinear frame 130 have been put together. As shown in FIG. 10, when the two latching portions 122 of the second rectilinear frame 120 are latched to the two latching recesses 133 of the third rectilinear frame 130, relative rotation of the third rectilinear frame 130 with respect to the second rectilinear frame 120 is checked. One of the two latching recesses 133 is formed longer in the peripheral direction than the other one, corresponding to the fact that one of the two latching portions 122 is formed longer in the peripheral direction than the other one. This increases the strength of the two latching recesses 133.

The third rectilinear frame 130 has six bayonet protrusions E3, three rectilinear grooves a5, and three rectilinear grooves a6. In FIG. 9, however, only two of the bayonet protrusions E3 are shown.

The shape of the six bayonet protrusions E3 in a cross section including the optical axis is a trapezoidal shape in which the side on the outside in the radial direction is shorter, and the side on the inside in the radial direction is longer. Also, the bayonet protrusions E3 are formed in the peripheral direction in the approximate center of the outer peripheral face 130T. Two of the bayonet protrusions E3 are formed parallel to each other at the same position in the peripheral direction. These two bayonet protrusions E3 form a set, and these sets are disposed at three places at a substantially constant pitch in the peripheral direction. In other words, three sets of the bayonet protrusions E3, that is, the six bayonet protrusions E3, are disposed on the third rectilinear frame 130. The six bayonet protrusions E3 are engaged with the two bayonet grooves e3 of the second rotary frame 220. In this embodiment, the bayonet protrusions E3 and the bayonet grooves e3 constitute a bayonet mechanism for rotatably engaging the third rectilinear frame 130 with the second rotary frame 220, and integrally engaging them in the optical axis direction.

The three rectilinear grooves a5 pass through the third rectilinear frame main body 131 from the inner peripheral face 130S to the outer peripheral face 130T. The three rectilinear grooves a5 extend in the optical axis direction, and are disposed at a substantially constant pitch in the peripheral direction.

The three rectilinear grooves a6 pass through the third rectilinear frame main body 131 from the inner peripheral face 130S to the outer peripheral face 130T. The three rectilinear grooves a6 extend in the optical axis direction, and are disposed at a substantially constant pitch in the peripheral direction.

In this embodiment, the three rectilinear grooves a5 and the three rectilinear grooves a6 are disposed alternately in the peripheral direction.

7. Configuration of First Lens Group Frame 310

Figure 11:
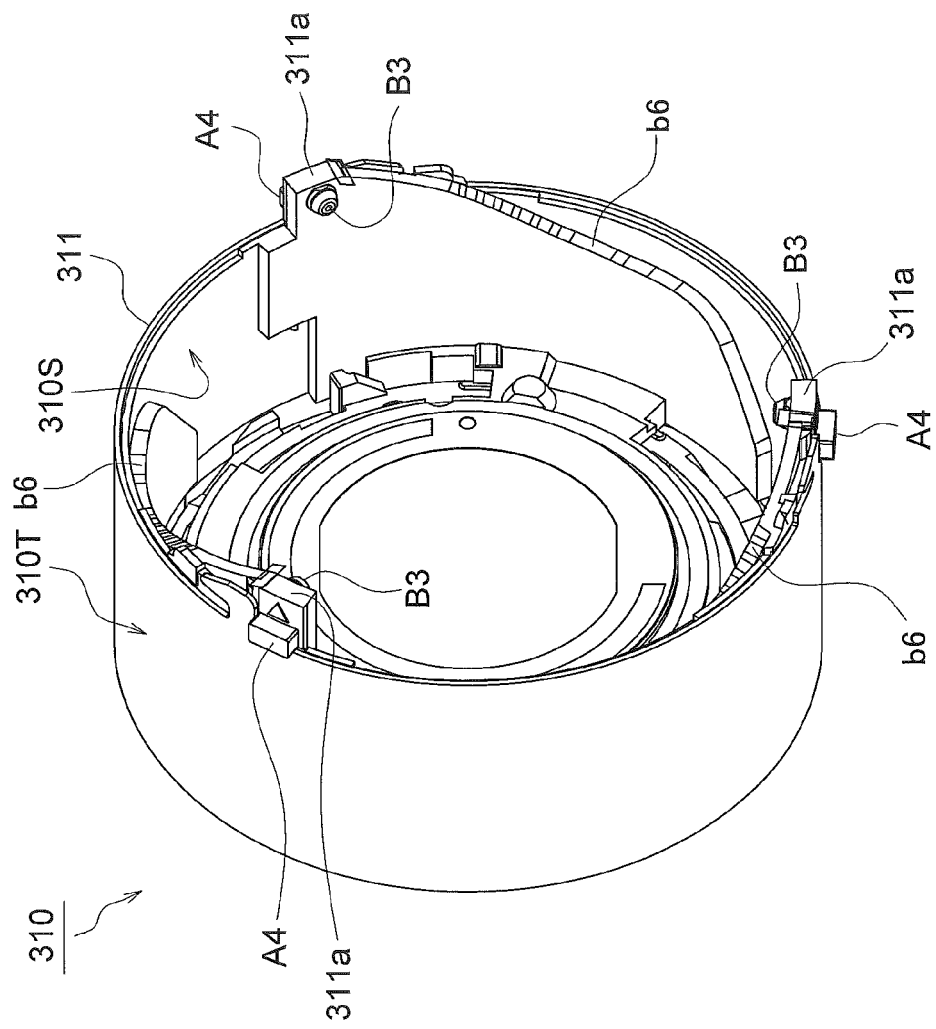
FIG. 11 is an oblique view of a first lens group frame.

FIG. 11 is an oblique view of the first lens group frame 310. The first lens group frame 310 has a first lens group frame main body 311, three rectilinear protrusions A4, and three cam protrusions B3.

The first lens group frame main body 311 is formed in a cylindrical shape, and has an inner peripheral face 310S and an outer peripheral face 310T. Three protrusions 311a that protrude toward the rear are formed on the first lens group frame main body 311.

The three rectilinear protrusions A4 are provided to the outer peripheral face 310T of the protrusions 311a, and are disposed at a substantially constant pitch in the peripheral direction. The three rectilinear protrusions A4 are engaged with the three rectilinear grooves a4 of the second rectilinear frame 120.

The three cam protrusions B3 are provided to the inner peripheral face 310S of the protrusions 311a, and are disposed at a substantially constant pitch in the peripheral direction. The three cam protrusions B3 are engaged with the three cam grooves b3 of the second rotary frame 220.

In this embodiment, the three rectilinear protrusions A4 and the three cam protrusions B3 are disposed substantially opposite each other, with the protrusions 311a in between.

8. Configuration of Second Lens Group Frame 320

Figure 12:
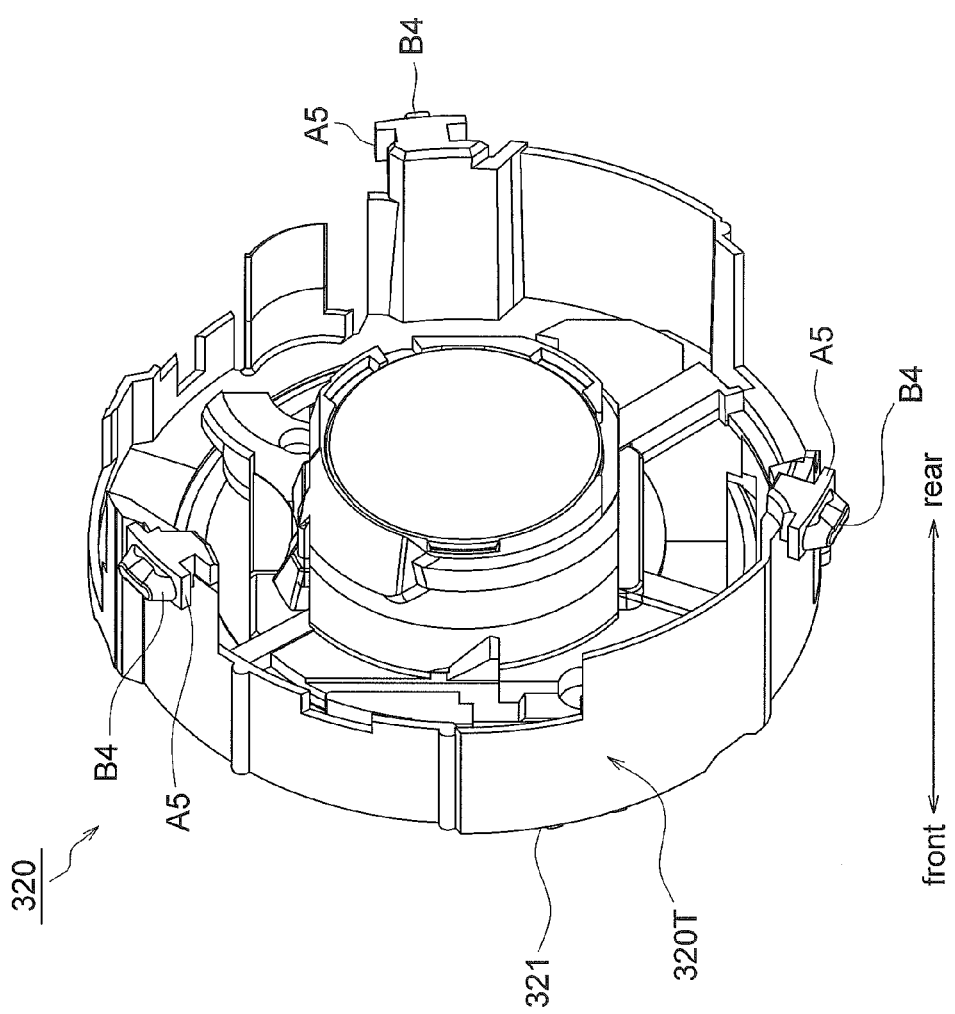
FIG. 12 is an oblique view of a second lens group frame.

FIG. 12 is an oblique view of the second lens group frame 320. The second lens group frame 320 has a second lens group frame main body 321, three rectilinear protrusions A5, and three cam protrusions B4.

The second lens group frame main body 321 is formed in a cup shape, and has an outer peripheral face 320T.

The three rectilinear protrusions A5 are formed on the rear end of the outer peripheral face 320T, and are disposed at a substantially constant pitch in the peripheral direction. The three rectilinear protrusions A5 are engaged with the three rectilinear grooves a5 of the third rectilinear frame 130.

The three cam protrusions B4 are formed on the three rectilinear protrusions A5, that is, o the outside in the radial direction. The three cam protrusions B4 are engaged with the three cam grooves b4 of the second rotary frame 220. The cam protrusions B4 are formed so as to extend in the peripheral direction, that is, the second direction. The cam protrusions B4 have a shape in which two conical faces are aligned and separated in the peripheral direction, that is, the second direction.

Figure 13A:
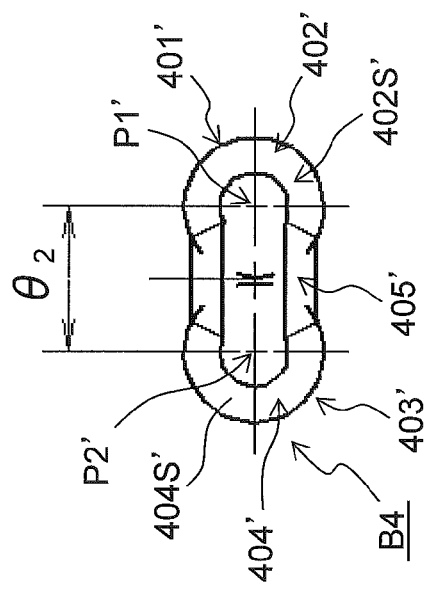
FIGS. 13A-13C are diagrams of the configuration of a cam protrusion B4.
Figure 13B:
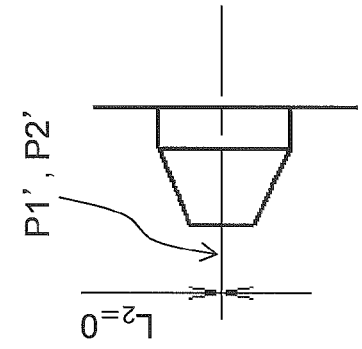
Figure 13C:
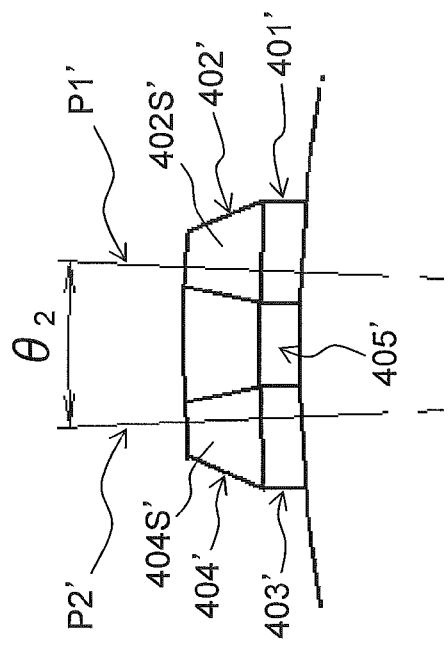

Here, FIG. 13a shows a cam protrusion B4 as seen from the outside in the radial direction, FIG. 13b shows the cam protrusion B4 as seen from the peripheral direction, and FIG. 13c shows the cam protrusion B4 as seen from the optical axis direction. The axis P1' and the axis P2' are disposed at positions that are separated by $L_2$ in the optical axis direction and separated by $\theta_2$ in the peripheral direction. The axis P1' and the axis P2' are straight lines that are perpendicular to the cylinder axis of the second rotary frame 220, and are straight lines that pass through the cylinder center of the second rotary frame 220 as seen from the optical axis direction. In the example disclosed herein, the cylinder center of the second rotary frame 220 coincides with the optical axis. Here, $L_2$ is the length, and $\theta_2$ is the angle. In the cam protrusions B4, $L_2$=0. The direction of the line linking the axis P1' and the axis P2' determined by $L_2$ and $\theta_2$ coincides with the second direction (see FIG. 17) of the cam grooves b4 of the second rotary frame 220, that is, with the peripheral direction.

The cam protrusions B4 have a first cylinder portion 401', a first cone portion 402', a second cylinder portion 403', a second cone portion 404', and a linking portion 405'. The cam protrusions B4 also have first and second conical faces 402S' and 404S' that form the two end faces. The first conical face 402S' is part of the conical face centered on the axis P1', and the second conical face 404S' is part of the conical face centered on the axis P2'. The configuration of the cam protrusions B4 is the same as the configuration of cam protrusions B5 of the shutter frame 335 (discussed below).

9. Configuration of Third Lens Group Frame 330

Figure 14:
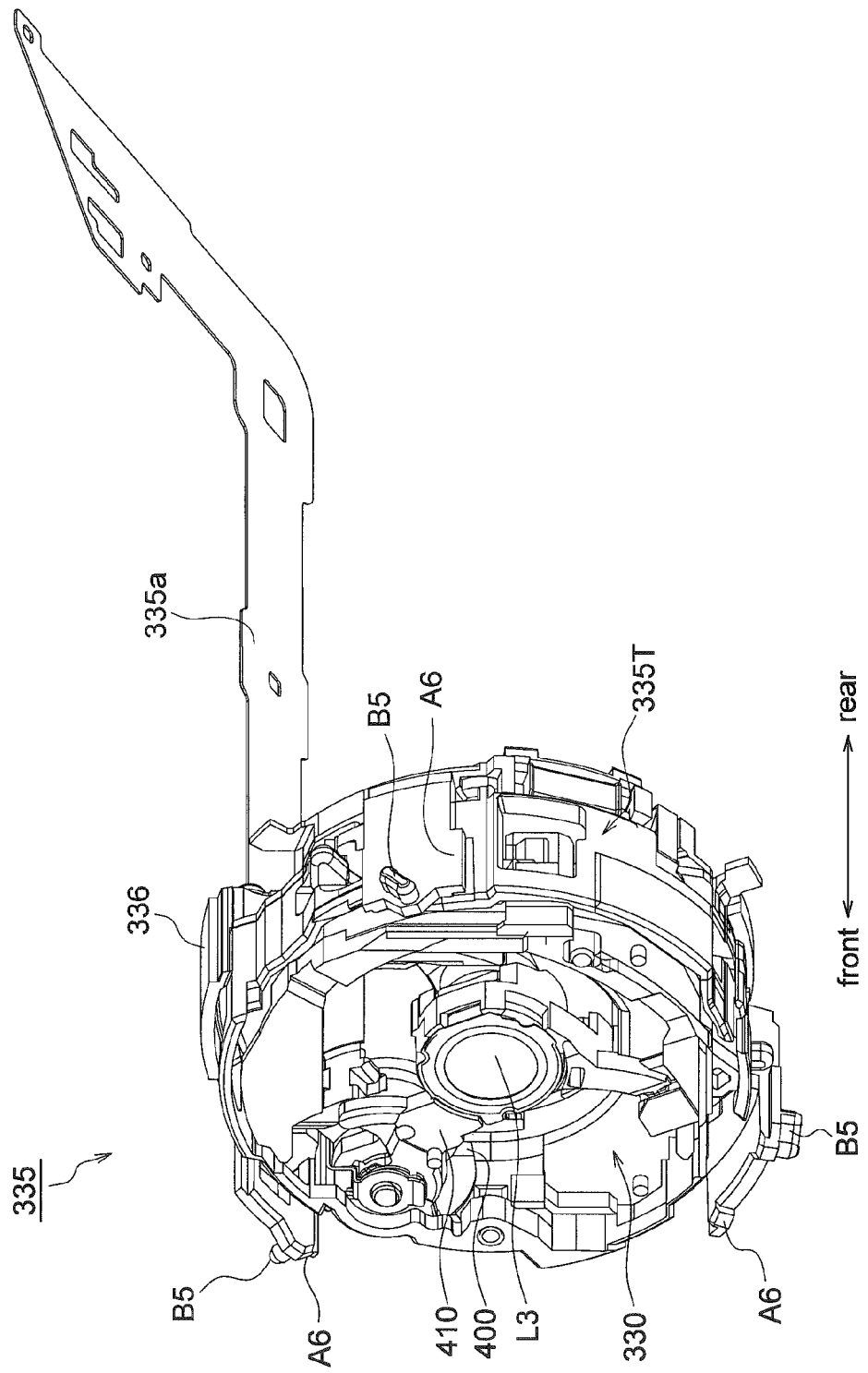
FIG. 14 is an oblique view of a shutter frame.

FIG. 14 shows the state when the third lens group frame 330 has been housed in the interior of the shutter frame 335. The configuration of the third lens group frame 330 will be described through reference to FIG. 14.

The third lens group frame 330 (an OIS (optical image stabilizer) unit) may has an OIS frame 400, a retracting lens frame 410, and the third lens group L3 for image blur correction.

The OIS frame 400 is mounted to the shutter frame 335. More specifically, the OIS frame 400 is movable in a plane perpendicular to the optical axis. Even more specifically, a magnet (not shown) is fixed to the OIS frame 400, and a coil (not shown) is fixed to the shutter frame 335 at a position that is opposite the magnet. In this state, when power is supplied from a camera circuit (not shown) to the coil of the shutter frame, current flows to the coil and a magnetic field is generated. This magnetic field drives the magnet of the OIS frame 400, and the OIS frame 400 moves under this drive force within a plane perpendicular to the optical axis.

The refracting lens frame 410 is supported by the OIS frame 400 movably around a refraction axis that is substantially parallel to the optical axis. The retracting lens frame 410 can be switched between a correction position (first orientation) in which the third lens group L3 corrects image blur, and a refraction position (second orientation) in which the third lens group L3 is refracted from the optical axis. The retracting lens frame 410 supports the third lens group L3, which is made up of at least one lens.

10. Configuration of Shutter Frame 335

The configuration of the shutter frame 335 will now be described through reference to FIG. 14. The shutter frame 335 has a shutter frame main body 336, three rectilinear protrusions A6, and the three cam protrusions B5.

The shutter frame main body 336 is formed in a cylindrical shape, and has an outer peripheral face 335T.

The three rectilinear grooves a6 are formed on the outer peripheral face 335T, and are disposed at a substantially constant pitch in the peripheral direction. The three rectilinear protrusions A6 are engaged with the three rectilinear grooves a6 of the third rectilinear frame 130.

The three cam protrusions B5 are provided to the front end of the three rectilinear protrusions A6. The three cam protrusions B5 are engaged with the three cam grooves b5 of the second rotary frame 220. The cam protrusions B5 are formed so as to extend in a direction that intersects with the peripheral direction (hereinafter referred to as the first direction).

Figure 15:
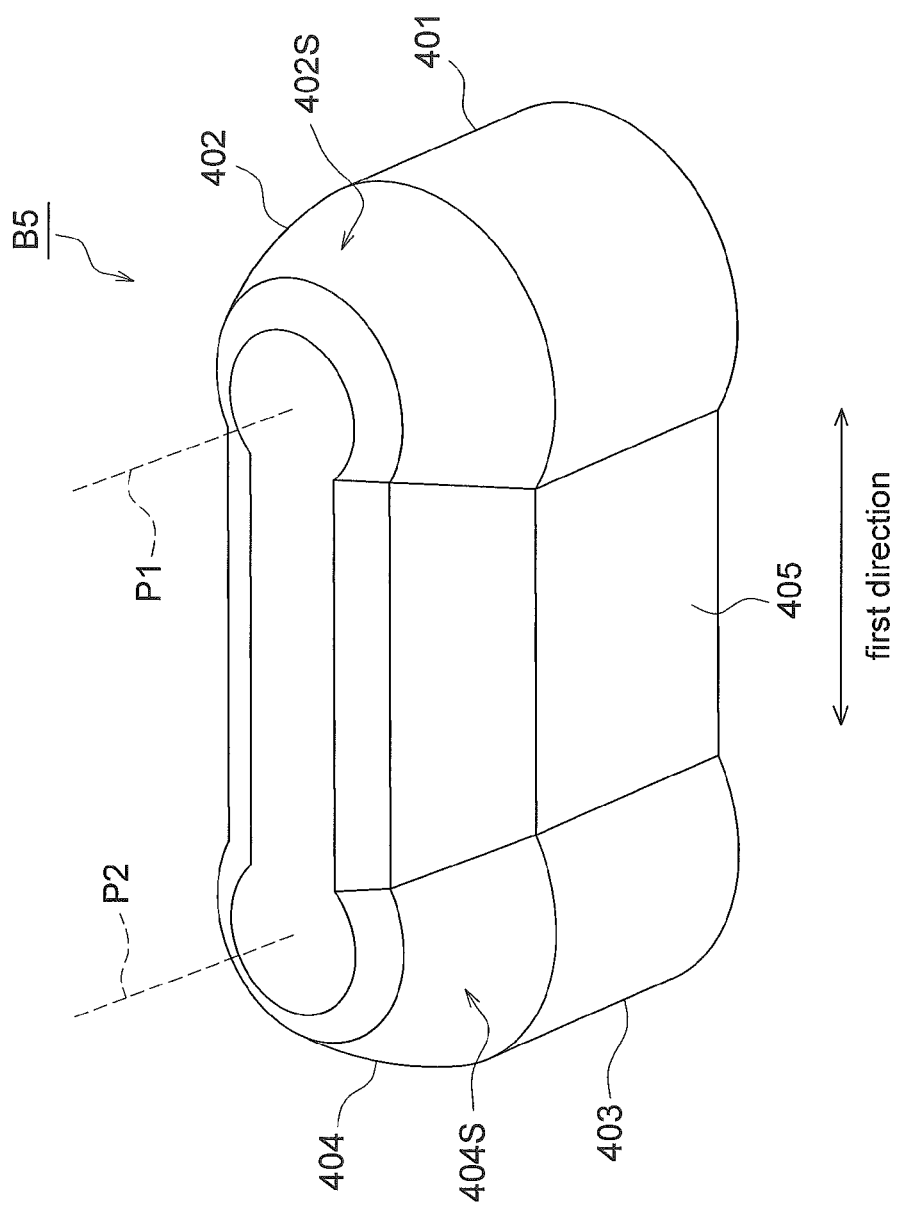
FIG. 15 is an oblique view of the configuration of a cam protrusion B5.
Figure 16B:
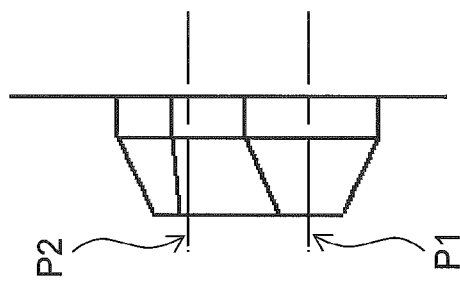
FIGS. 16A-16C are diagrams of the configuration of the cam protrusion B5.
Figure 16A:
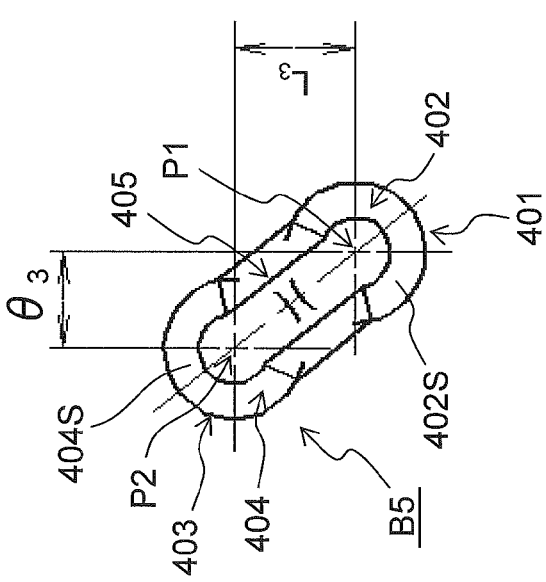
Figure 16C:
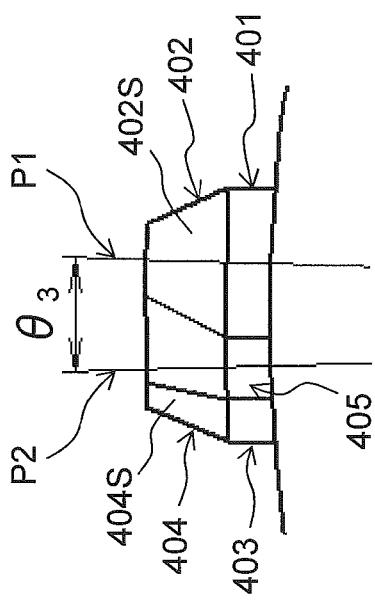

FIG. 15 is an oblique view of the configuration of a cam protrusion B5. FIG. 16a shows the cam protrusion B5 as seen from the outside in the radial direction, FIG. 16b shows the cam protrusion B5 as seen from the peripheral direction, and FIG. 16c shows the cam protrusion B5 as seen from the optical axis direction.

As shown in FIGS. 15 and 16, the cam protrusions B5 are formed on the shutter frame 335 so that the length in the first direction is greater than the length of a first cam groove, that is, in the width direction of the cam grooves b4. More specifically, the cam protrusions B5 are formed so as to have their major axis in the first direction and their minor axis in a direction perpendicular to the first direction. In other words, the cam protrusions B5 have a shape in which two conical faces are aligned and separated in the first direction. The spacing of the two conical faces is greater than the length in the width direction of the first cam groove. In the case of a cam in which the width of the cam groove is not constant in the radial direction, that is, with a tapered cam in which the cam face has an angle with respect to the direction perpendicular to the optical axis, as in the example disclosed here, the spacing of the two conical faces should be greater than the minimum cam groove width within the radial direction range in which the two conical faces are present.

Also, the cam protrusions B5 are formed on the shutter frame 335 so that the angle formed by a straight line on the inner peripheral face 220S parallel to the optical axis and the first direction of the cam protrusions B5 is greater than 0 degrees. More specifically, the cam protrusions B5 are formed on the shutter frame 335 so that the major axis of the cam protrusions B5 is inclined with respect to a straight line on the inner peripheral face 220S parallel to the optical axis.

More specifically, the cam protrusions B5 have a first cylindrical portion 401, a first cone portion 402, a second cylinder portion 403, a second cone portion 404, and a linking portion 405.

The axis P1 and the axis P2 are straight lines that are perpendicular to the cylinder axis of the second rotary frame 220, and pass through the cylinder axis of the second rotary frame 220 as seen from the optical axis direction, respectively. $L_3$ here is a length, and $\theta_3$ is an angle.

The first cylinder portion 401 is disposed on the rectilinear protrusion A6. The first cylinder portion 401 is part of a cylinder whose center is the axis P1. The first cone portion 402' is disposed on the first cylinder portion 401. The first cone portion 402 is part of a cone whose center is the axis P1. The first cone portion 402 has a first conical face 402S formed on one end face of the cam protrusion B5 in the first direction. The first conical face 402S is part of a conical face had by a cone whose center is the axis P1.

The second cylinder portion 403 is disposed on the rectilinear protrusion A6. The second cylinder portion 403 is part of a cylinder whose center is the axis P2. The second cone portion 404 is disposed on the second cylinder portion 403. The second cone portion 404 is part of a cone whose center is the axis P2. The second cone portion 404 has a second conical face 404S that forms the other end face of the cam protrusion B5 in the first direction. The second conical face 404S is part of a conical face had by a cone whose center is the axis P2.

The linking portion 405 links the first cylinder portion 401 and the second cylinder portion 403, and links the first cone portion 402 and the second cone portion 404. In the example disclosed herein, the linking portion 405 is disposed to the inside of a face in contact with two conical faces, and to the inside of a face in contact with two cylindrical faces. This indicates that the shape of the cam protrusions B5 is sufficient to cross the cam grooves, merely with two conical faces that are more widely spaced than the width of the cam grooves to be crossed. This is because if there are two conical faces, when one of them crosses a cam groove and is not fitted into the cam groove, the other conical face is fitted into the cam groove. Specifically, a state can be created in which one of the two conical faces is always fitted into the cam groove.

In the example disclosed herein, the linking portions 405 are there to increase the strength of the cam protrusions B5, and have a shape that is recessed from the cam grooves, except for the portion necessary to ensure strength. Accordingly, the portion where accuracy is necessary is just the conical face, and can be narrower.

Instead of the above, the linking portion 405 may be constituted by a face that is in contact with two conical faces. In this case, since the linking portion 405 is in contact with the cam groove, the range where accuracy is necessary is wider. However, since the cam protrusions B5 can be made larger, the strength of the cam protrusions B5 can be further raised. The linking portion 405 may also be constituted by a face that is in contact with the two cylinder portions 401 and 403. This also provides the same effect. Also, the linking portion 405 may be configured so as to link only the first cylinder portion 401 and the second cylinder portion 403. In this case, the range where accuracy is necessary can be even narrower.

Figure 18:
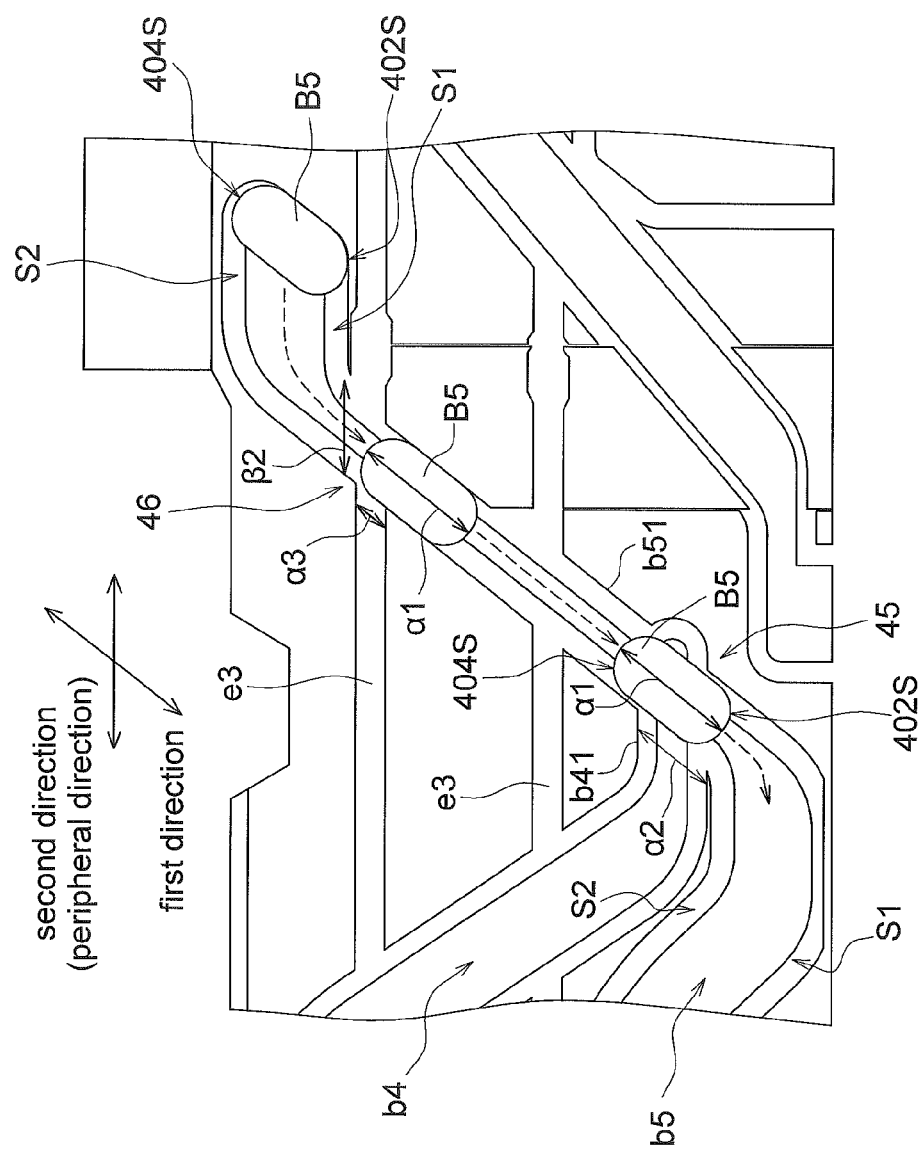
FIG. 18 is a detail view of FIG. 15.

As shown in FIGS. 16a to 16c, the axis P1 and the axis P2 are disposed at positions that are separated by $L_3$ in the optical axis direction and $\theta_3$ in the peripheral direction. The direction of the line connecting the axis P1 and the axis P2 determined by $L_3$ and $\theta_3$ coincides with the first direction of the cam grooves b5. The first direction appears different in FIG. 18. FIG. 16a is a view from the outside in the radial direction. FIG. 18 is a view from the inside in the radial direction. Thus, the orientation of the view is reversed, so the directions in the two views appear different.

11. Engagement of Cam Grooves b4 and b5 with Cam Protrusions B4 and B5

Figure 17:
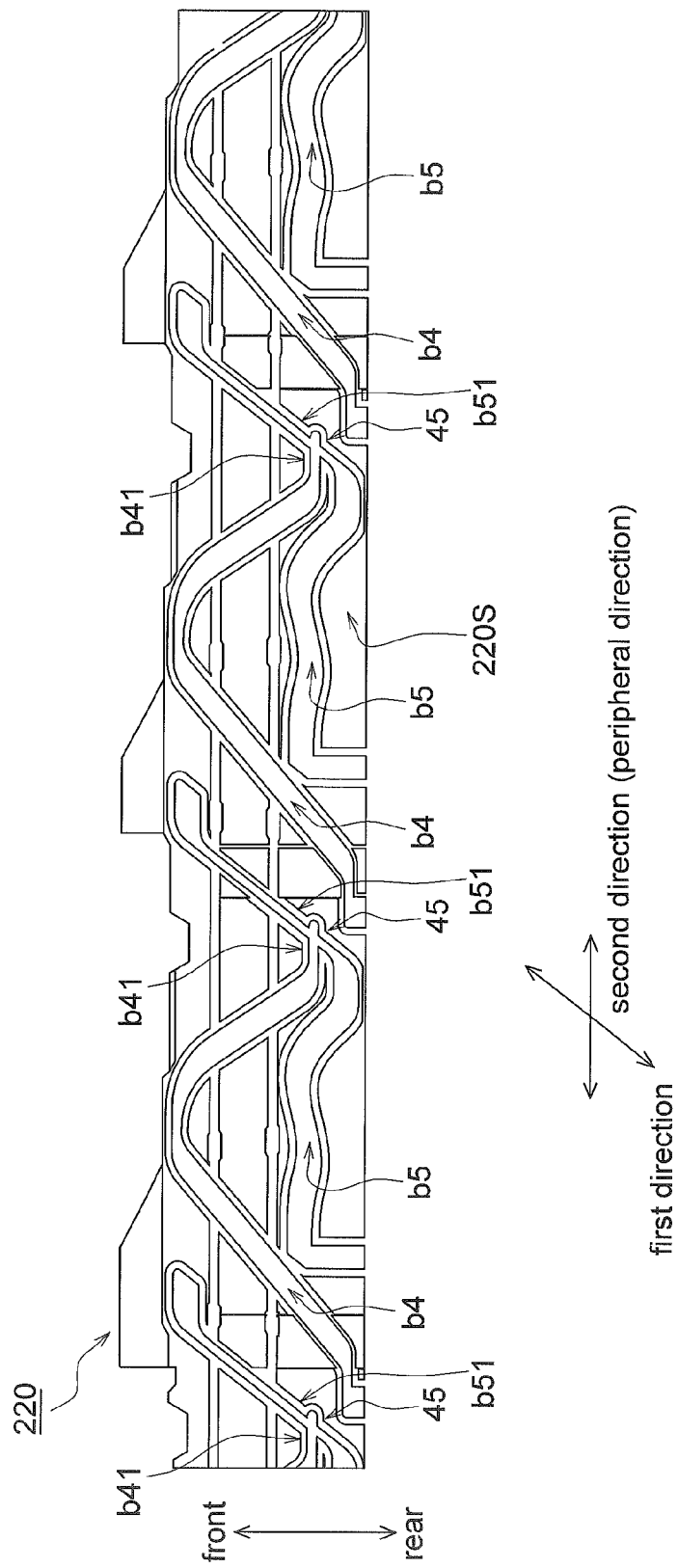
FIG. 17 is a developed view of the inner peripheral face of the second rotary frame as seen from the inside in the radial direction.
Figure 19:
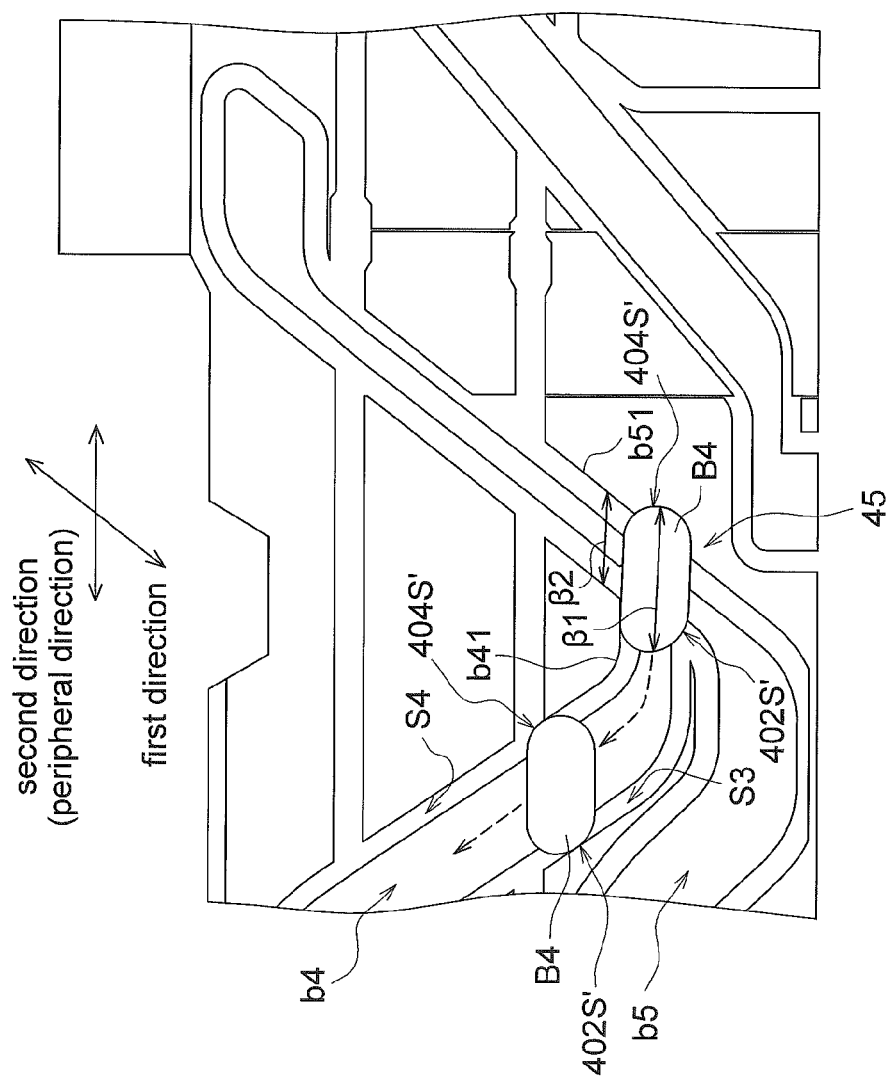
FIG. 19 is a detail view of FIG. 15.

Next, the engagement of the cam grooves b4 and b5 with the cam protrusions B4 and B5 will be described through reference to the drawings. FIG. 17 is a developed view of the inner peripheral face 220S of the second rotary frame 220. FIGS. 18 and 19 are detail views of FIG. 17. FIG. 18 schematically depicts how the cam protrusions B5 move, and FIG. 19 schematically depicts how the cam protrusions B4 move.

As shown in FIG. 17, the cam grooves b5 and the cam grooves b4 intersect in an intersection region 45. More specifically, first straight line parts b51 of the cam grooves b5, which are formed in the first direction that intersects the peripheral direction, intersect second straight line parts b41 of the cam grooves b4 formed in the second direction, which lies along the peripheral direction. In this embodiment, the second direction is parallel to the peripheral direction. However, the term "straight line" as used for the first straight line parts b51 and the second straight line parts b41 means a straight line in a developed view, and on the cylindrical second rotary frame 220, the first straight line parts b51 and the second straight line parts b41 are not straight lines. On the cylindrical second rotary frame 220, the first straight line parts b51 are spiral curved lines, and the second straight line parts b41 are arc-shaped curved lines.

As shown in FIG. 18, the cam protrusions B5 move along the cam grooves b5. The cam protrusions B5 cross the second straight line parts b41 of the cam grooves b4 in the intersection region 45. If the cam protrusions B5 here are small in size, there is the risk that the cam protrusions B5 snags on the second straight line parts b41. In this embodiment, however, the length α1 of the cam protrusions B5 in the first direction is greater than the length α2 of the second straight line parts b41. Accordingly, the cam protrusions B5 cannot smoothly cross the second straight line parts b41.

As shown in FIG. 18, in the portion of the cam grooves b5 formed in the first direction, the first conical faces 402S of the cam protrusions B5 are in contact with both cam faces (front and rear in the optical axis direction) that make up the cam grooves b5, and the second conical faces 404S of the cam protrusions B5 are also in contact with both cam faces (front and rear in the optical axis direction) that make up the cam grooves b5. In the portion of the cam grooves b5 not formed in the first direction, the cam grooves b5 each have a first cam face S1 with which the first conical face 402S (see FIG. 15) of the cam protrusion B5 comes into contact, and a second cam face S2 with which the second conical face 404S (see FIG. 15) of the cam protrusion B5 comes into contact. The first cam face S1 can be defined by the envelope of the first conical face 402S. The envelope of the first conical face 402S is a face that includes the path traced by the axis P1 of the first conical face 402S in a transition state between an imaging enabled state and a housed state (including both the imaging enabled state and the housed state). Similarly, the second cam face S2 can be defined by the envelope that includes the path traced by the axis P2 of the second conical face 404S (the envelope of the second conical face 404S) in a transition state. Therefore, when the first conical face 402S hits the first cam face S1, and the second conical face 404S hits the second cam face S2, the cam protrusion B5 is movable along the cam groove b5.

The cam grooves b5 have a shape that combines two grooves: a groove shape when the first conical face 402S has moved along the cam path, and a groove shape when the second conical face 404S has moved along the cam path. In other words, the cam grooves b5 have a shape that is an aggregate of two cam grooves separated by $L_3$ and $\theta_3$. The groove shape when the first conical face 402S has moved along the cam path is the same as that of an ordinary cam groove. Therefore, a cam groove can be configured even when the amount of movement in the cylinder axis direction (that is, the optical axis direction) corresponding to the amount of movement in the rotational angle direction of the cam protrusions B5 is nonlinear, that is, when it is the curve in FIG. 17. Similarly, the groove shape determined by the path of the second conical face 404S is nonlinear. As a result, a cam mechanism can be provided in which the cam protrusions B5 can follow along the entire length of the cam grooves b5 in which the amount of movement in the cylinder axis direction (that is, the optical axis direction) corresponding to the amount of movement in the rotational angle direction is nonlinear, while the two cam grooves can cross each other. Accordingly, there is more latitude in the design of the cam grooves b5.

In FIGS. 18 and 19, the cam protrusions B5 are drawn by lines tangent to two circles, but these are just simplified drawings of the cam protrusions B5, and are different from the shape of the cam protrusions in the disclosed example. As shown in FIGS. 13, 15, and 16, the shape of the cam protrusions B5 in the disclosed example is such that the portion linking the two circles (the portion corresponding to the linking portion 405) lies to the inside of the lines tangent to the two circles. Of course, the cam protrusions B5 may be constituted by lines tangent to two circles as shown in FIGS. 18 and 19.

As shown in FIG. 19, the cam protrusions B4 move along the cam grooves b4. The cam protrusions B4 cross the first straight line parts b51 of the cam grooves b5 in the intersection region 45. If the cam protrusions B4 here are small in size, there is the risk that the cam protrusions B4 snags on the first straight line parts b51. In this embodiment, however, the length β1 of the cam protrusions B4 in the second direction is greater than the length 132 of the first straight line parts b5. Accordingly, the cam protrusions B4 cannot smoothly cross the first straight line parts b51.

As shown in FIG. 19, in the portion of the cam grooves b4 formed in the second direction, the first conical faces 402S' of the cam protrusions B4 are in contact with both cam faces (front and rear in the optical axis direction) that make up the cam grooves b4, and the fourth conical faces 404S' of the cam protrusions B4 are also in contact with both cam faces (front and rear in the optical axis direction) that make up the cam grooves b4. In the portion of the cam grooves b4 not formed in the second direction, the cam grooves b4 each have a third cam face S3 with which the first conical face 402S' (see FIG. 13) of the cam protrusion B4 comes into contact, and a fourth cam face S4 with which the fourth conical face 404S' (see FIG. 13) of the cam protrusion B4 comes into contact. When the first conical face 402S' hits the third cam face S3, and the fourth conical face 404S' hits the fourth cam face S4, the cam protrusion B4 is movable along the cam groove b4.

The cam grooves b4 have a shape that combines two grooves: a groove shape when the first conical face 402S' has moved along the cam path, and a groove shape when the fourth conical face 404S' has moved along the cam path. In other words, the cam grooves b4 have a shape that is an aggregate of two cam grooves separated by $L_2$ and $\theta_2$. The configuration of the cam grooves b4 is the same as that of the cam grooves b5 discussed above.

12. Engagement of Frames

Figure 20:
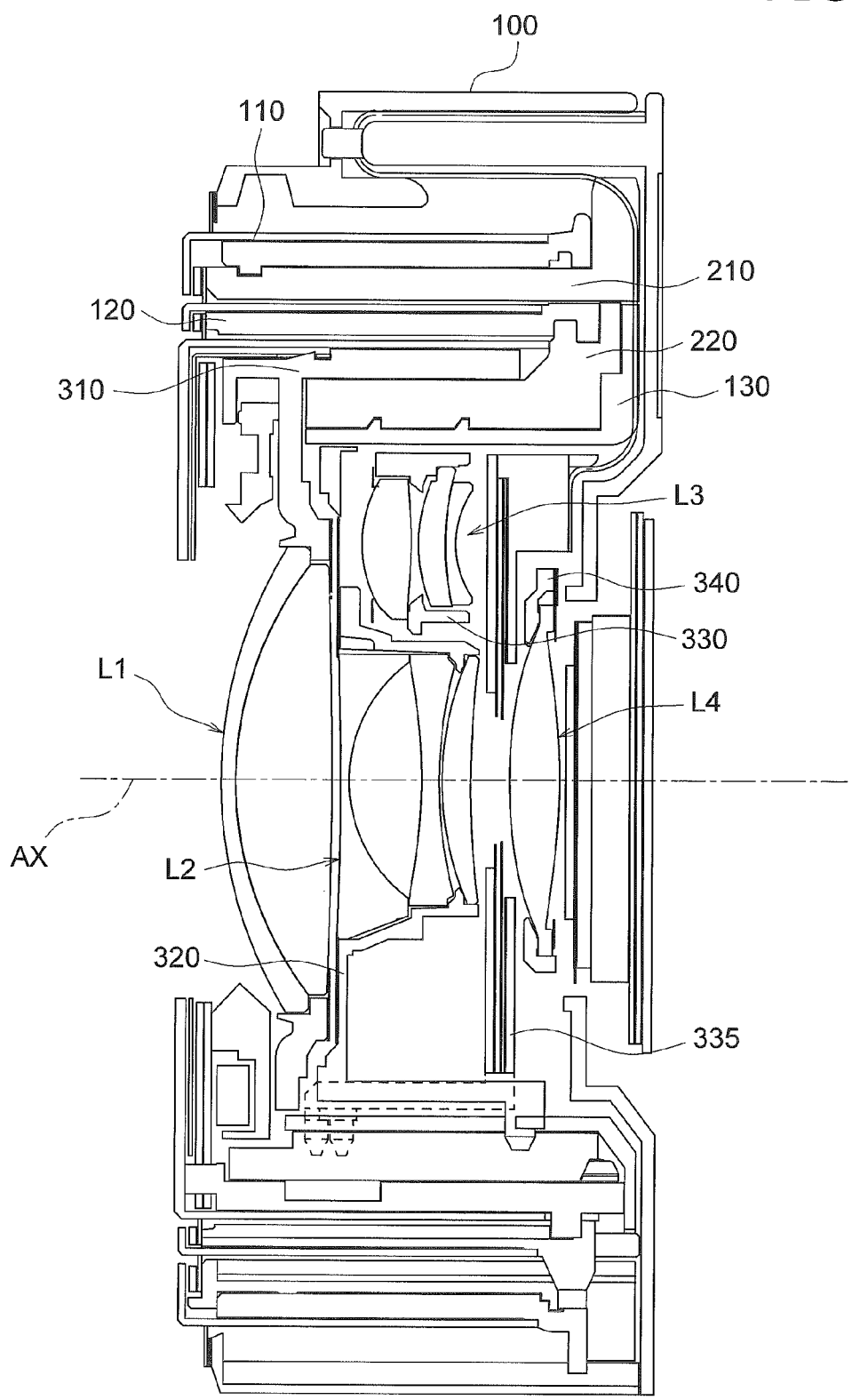
FIG. 20 is a simplified cross section of the lens barrel (retracted state)
Figure 21:
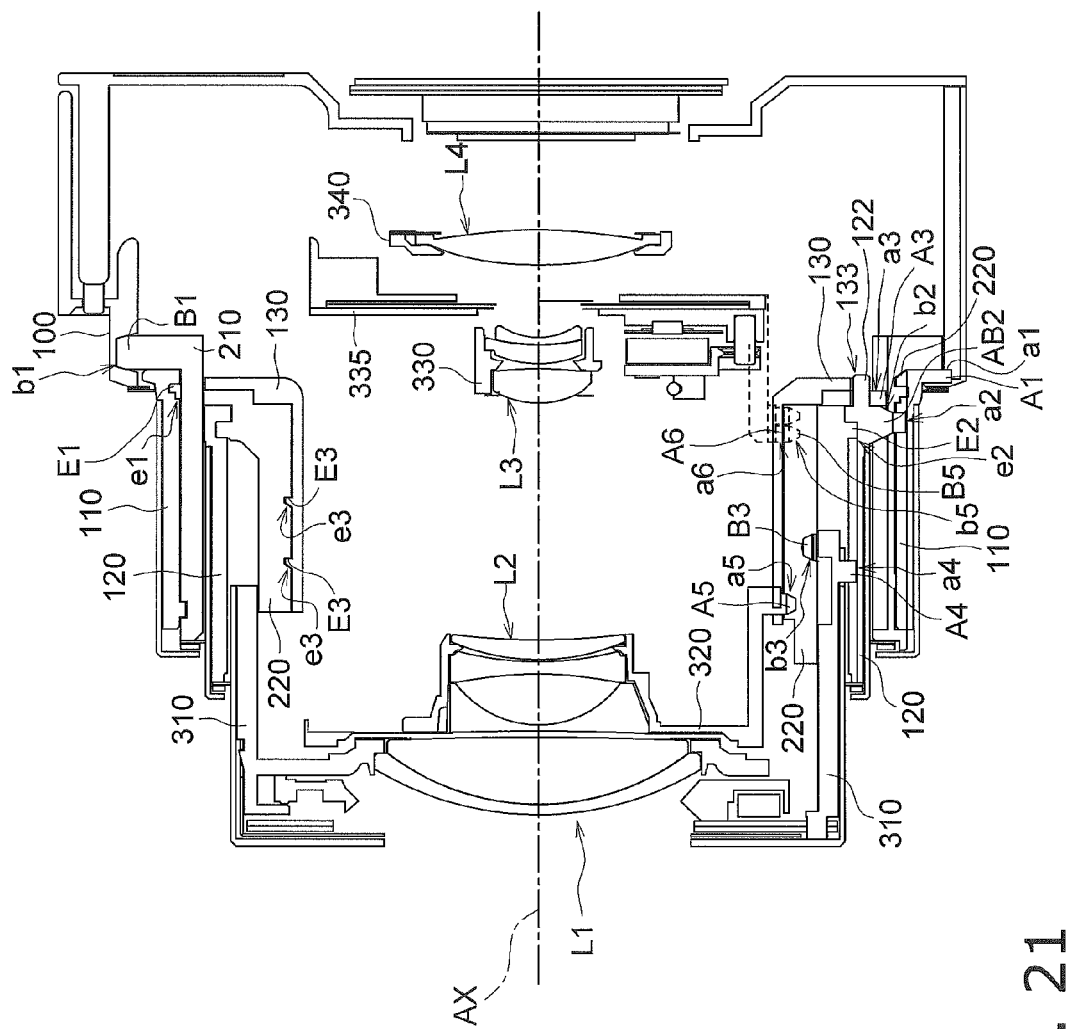
FIG. 21 is a simplified cross section of the lens barrel (wide angle state)
Figure 22:
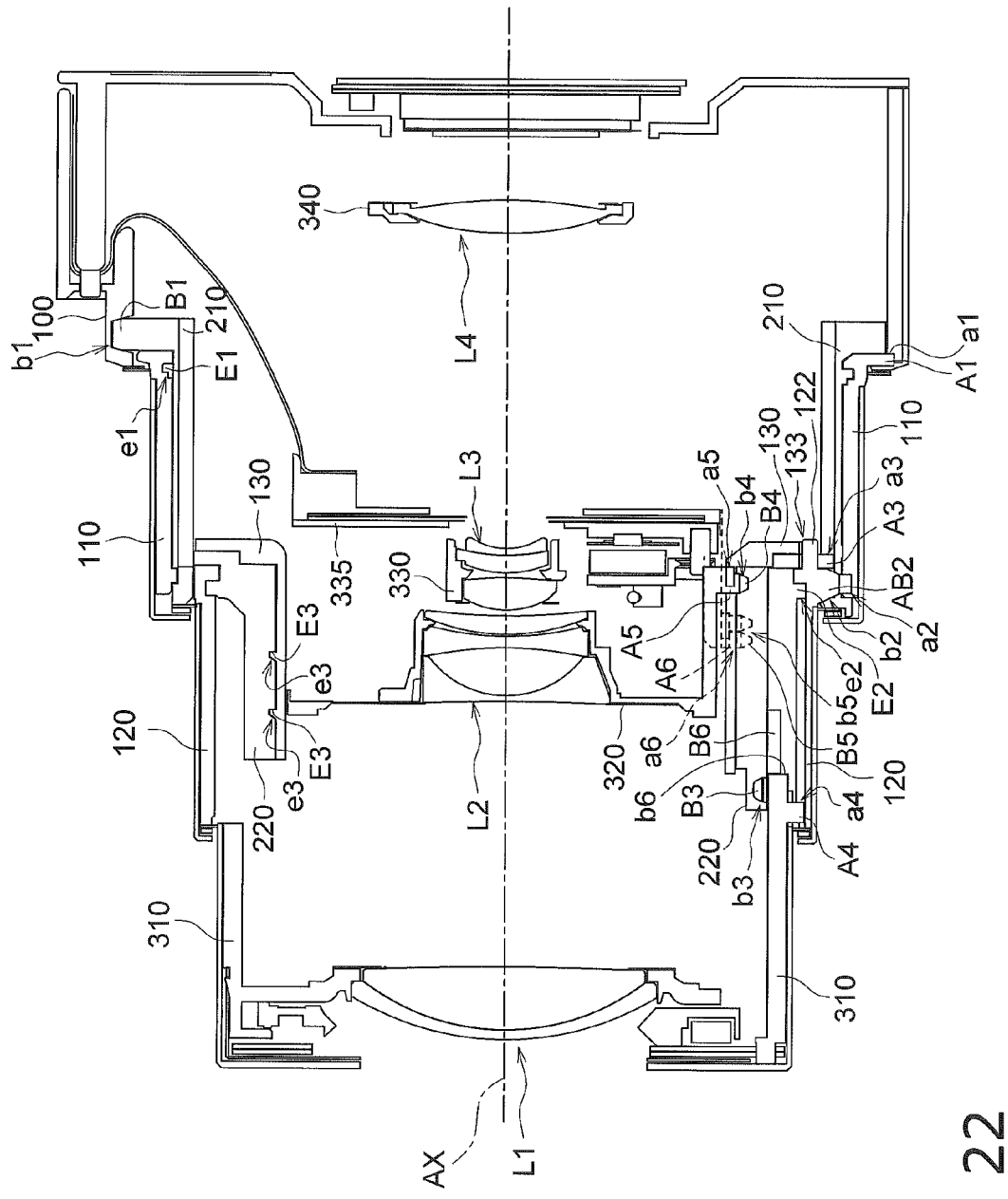
FIG. 22 is a simplified cross section of the lens barrel (telephoto state).

FIGS. 20 to 22 are cross sections of the lens barrel 20. However, FIGS. 20 to 22 are schematics that combine a plurality of cross sections passing through the optical axis AX. The lens barrel 20 is shown in its refracted state in FIG. 20, in its wide angle state in FIG. 21, and in its telephoto state in FIG. 22. In this embodiment, the "imaging enable state" of the digital camera 1 means a state from the wide angle state to the telephoto state of the lens barrel 20.

The gear portion 212 of the first rotary frame 210 meshes with the zoom gear 242 (not shown). The cam followers B3 of the first rotary frame 210 are engaged with the cam grooves b1 of the stationary frame 100. Therefore, the first rotary frame 210 is movable in the optical axis direction while rotating in the peripheral direction under the drive force of the zoom motor 241.

The rectilinear protrusions A1 of the first rectilinear frame 110 are engaged with the rectilinear grooves a1 of the stationary frame 100. The bayonet protrusions E1 of the first rotary frame 210 are engaged with the bayonet groove e1 of the first rectilinear frame 110. Therefore, the first rectilinear frame 110 is movable rectilinearly in the optical axis direction along with the first rotary frame 210.

The rectilinear cam followers AB2 of the second rectilinear frame 120 are inserted into the cam grooves b2 of the first rotary frame 210, and are engaged with the rectilinear grooves a2 of the first rectilinear frame 110. Therefore, the second rectilinear frame 120 is movable rectilinearly in the optical axis direction according to the rotation of the first rotary frame 210.

The rectilinear protrusions A3 of the second rotary frame 220 are engaged with the rectilinear grooves a3 of the first rotary frame 210. The bayonet protrusions E2 of the second rotary frame 220 are engaged with the bayonet groove e2 of the second rectilinear frame 120. Therefore, the second rotary frame 220 is movable in the optical axis direction along with the second rectilinear frame 120 while rotating in the peripheral direction along with the first rotary frame 210.

The latching portions 122 of the second rectilinear frame 120 are latched to the latching recesses 133 of the third rectilinear frame 130. The bayonet protrusions E3 of the third rectilinear frame 130 are engaged with the bayonet grooves e3 of the second rotary frame 220. The spacing of at least two of the rectilinear protrusions A3 of the second rotary frame 220 is approximately 120° or more, the spacing of the two latching portions 122 of the second rectilinear frame 120 is approximately 120° or more, and the relative rotational angle between these during zoom drive is approximately 120° or less. Accordingly, the latching portions 122 and the rectilinear protrusions A3 are disposed at the same positions in the radial direction and the optical axis direction, but are disposed at different positions in the rotational angle direction, that is, the peripheral direction. The third rectilinear frame 130 is movable rectilinearly in the optical axis direction along with the second rectilinear frame 120 without interfering with the rotation of the second rotary frame 220.

One of the two latching portions 122 is formed longer in the peripheral direction than the other one, and correspondingly, one of the latching recesses 133 is formed longer in the peripheral direction than the other one, but the third rectilinear frame 130 is preferably made longer in the peripheral direction to the extent that it does not interfere with the rotation of the second rotary frame 220.

The spacing of at least two of the rectilinear protrusions A3 of the second rotary frame 220 is approximately 150°, the spacing of the two latching portions 122 of the second rectilinear frame 120 is approximately 150°, and the relative rotational angle between these during zoom drive is approximately 150° or less. Therefore, the third rectilinear frame 130 does not interfere with the rotation of the second rotary frame 220. The same applies to the other angles.

The rectilinear protrusions A4 of the first lens group frame 310 are engaged with the rectilinear grooves a4 of the second rectilinear frame 120. Also, the cam protrusions B3 of the first lens group frame 310 are engaged with the cam grooves b3 of the second rotary frame 220. Therefore, the first lens group frame 310 is movable rectilinearly in the optical axis direction according to the rotation of the second rotary frame 220.

The cams b6 of the first lens group frame 310 engage with the cam followers B6 of the second rotary frame 220. The first lens group frame 310 and the second rotary frame 220 are engaged by two cam mechanisms. The two cam mechanisms are constituted by engagement of the cam grooves b3 and the cam protrusions B3, and engagement of the cams b6 and the cam followers B6. This prevents damage or dislocation of the frames in the event that an external force is inputted from the subject side in the optical axis direction when the camera is dropped, etc.

The rectilinear protrusions A5 of the second lens group frame 320 are engaged with the rectilinear grooves a5 of the third rectilinear frame 130. Also, the cam protrusions B4 of the second lens group frame 320 are engaged with the cam grooves b4 of the second rotary frame 220. Therefore, the second lens group frame 320 is movable rectilinearly in the optical axis direction according to the rotation of the second rotary frame 220.

The rectilinear protrusions A6 of the shutter frame 335 are engaged with the rectilinear grooves a6 of the third rectilinear frame 130. Also, the cam protrusions B5 of the shutter frame 335 are engaged with the cam grooves b5 of the second rotary frame 220. Therefore, the shutter frame 335 is movable rectilinearly in the optical axis direction according to the rotation of the second rotary frame 220.

The third lens group frame 330 is mounted to the shutter frame 335, and when the shutter frame 335 moves rectilinearly in the optical axis direction with respect to the third rectilinear frame 130, the retracting lens frame 410 of the third lens group frame 330 is rotated by a refraction mechanism (not shown). Consequently, in a transition from the refracted state to the imaging enable state, the refracting lens frame 410 moves from its refracted position to a correction enabled position. Also, in a transition from the imaging enable state to the refracted state, the retracting lens frame 410 moves from the correction enabled position to the refracted position. When the refracting lens frame 410 is disposed in the correction enabled position, the third lens group L3 is movable within a plane perpendicular to the optical axis. That is, image blur correction is possible in this state.

Thus, the rotation of the first rotary frame 210 and the second rotary frame 220 under the drive force of the zoom motor 241 results in rectilinear motion of the lens frames 310, 320, and 335 and the first to third rectilinear frames 110 to 130.

Method for Assembling the Lens Barrel 20

The method for assembling the lens barrel 20 will now be described.

First, the third rectilinear frame 130 is inserted from the rear of the second rotary frame 220. The third rectilinear frame 130 is then rotated in the peripheral direction into the telephoto state.

Next, the second lens group frame 320 is inserted from the rear of the third rectilinear frame 130.

Next, the refracting lens frame 410 is inserted from the front of the OIS frame 400, and the refracting lens frame 410 is rotatably attached to the OIS frame 400.

Next, the OIS frame 400 is inserted from the front of the shutter frame 335.

Next, the shutter frame 335 is inserted from the rear of the third rectilinear frame 130. The second rotary frame 220 is then rotated in the peripheral direction into the refracted state.

Next, the second rotary frame 220 is inserted from the rear of the first lens group frame 310.

Next, the second rectilinear frame 120 is installed from the front of the first lens group frame 310.

Next, the first rotary frame 210 is inserted from the rear of the first rectilinear frame 110. The second rectilinear frame 120 is then inserted from the rear of the first rotary frame 210.

Next, the first rectilinear frame 110 is inserted from the rear of the stationary frame 100.

Finally, the first rotary frame 210 is rotated with respect to the stationary frame 100 into the refracted state.

Action and Effect (1) The lens barrel 20 comprises the second rotary frame 220 (an example of a first frame), the shutter frame 335 (an example of a second frame), and the second lens group frame 320 (an example of a third frame). The second rotary frame 220 has the cam grooves b5 (an example of first cam grooves) that are provided along the inner peripheral face 220S (an example of a cylindrical face) and that include the first straight line parts b51 formed along the first direction in a state in which the inner peripheral face 220S has been spread out flat, and the cam grooves b4 (an example of second cam grooves) that are provided along the inner peripheral face 220S, are formed along the second direction that intersects the first direction in a state in which the inner peripheral face 220S has been spread out flat, and include the second straight line parts b41 that intersect with the first straight line parts b51. The shutter frame 335 has the cam protrusions B5 (an example of first cam protrusions) that are engaged with the cam grooves b5. The second lens group frame 320 has the cam protrusions B4 (an example of second cam protrusions) that are engaged with the cam grooves b4. The depth of the cam grooves b5 is substantially the same as the depth of the cam grooves b4. The length α1 of the cam protrusions B5 in the first direction is greater than the length α2 of the second straight line parts b41 in the first direction. The length β1 of the cam protrusions B4 in the second direction is greater than the length β2 of the first straight line parts b51 in the second direction.

Since the length α1 of the cam protrusions B5 is thus greater than the length α2 of the second straight line parts b41, the cam protrusions B5 can smoothly cross the second straight line parts b41. Also, since the length β1 of the cam protrusions B4 is greater than the length β2 of the first straight line parts b5, the cam protrusions B4 can smoothly cross the first straight line parts b51.

(2) The first and second conical faces 402S and 404S (an example of the two end faces) of the cam protrusions B5 in the first direction are respectively a part of the conical faces whose centers are the axes P1 and P2.

Therefore, the cam protrusions B5 can be made to follow the cam grooves b5, for which the amount of movement in the cylinder axis direction (that is, the optical axis direction) corresponding to the amount of movement in the rotational axis direction is nonlinear. Therefore, there can be more latitude in the design of the cam grooves b5.

(3) The cam protrusions B5 are formed on the shutter frame 335 so that the length of the cam protrusions B5 in the first direction is greater than the length of the cam protrusions B5 in the width direction of the first cam grooves. More specifically, the cam protrusions B5 are formed in a shape that has its major axis in the first direction and its minor axis in a direction perpendicular to the first direction. This allows the cam protrusions B5 to move smoothly through the first straight line parts b51, and to smoothly cross the second straight line parts b41.

(4) The cam protrusions B5 are formed on the shutter frame 335 such that the angle formed by a straight line on the inner peripheral face 220S parallel to the optical axis and the first direction in the cam protrusions B5, is greater than 0 degrees. More specifically, the cam protrusions B5 are formed on the shutter frame 335 so that the major axis of the cam protrusions B5 is inclined with respect to a straight line on the inner peripheral face 220S parallel to the optical axis.

Consequently, at the first straight line parts b51 of the cam grooves b5, the cam protrusions B5 move through the cam grooves b5 so that the major axis lies in the first direction. On the other hand, in the portions of the cam grooves b4 that are not the first straight line parts b51, the cam protrusions B5 move through the cam grooves b5 so that the major axis and the direction in which the cam grooves b5 extend are at a specific angle. Thus forming the cam protrusions B5 allows the cam protrusions B5 to move smoothly over the cam grooves b5 of various shapes.

(5) The cam protrusions B5 have the first and second cam faces S1 and S2 with which the first and second conical faces 402S and 404S of the cam protrusions B5 come into contact.

Therefore, the cam protrusions B5 can follow the cam grooves b5, in which the amount of movement in the cylinder axis direction corresponding to the amount of movement in the rotational axis direction is nonlinear. This affords greater latitude in the design of the cam grooves b5.

Other Embodiments (A) In the above embodiment, the lens barrel 20 had a three-stage telescoping design made up of the first rectilinear frame 110, the second rectilinear frame 120, and the first lens group frame 310, but this is not the only option. The lens barrel 20 may instead have a two-stage telescoping design made up of the first rectilinear frame 110 and the second rectilinear frame 120. In this case, the lens barrel 20 need not comprise the second rotary frame 220 or the third rectilinear frame 130. The lens barrel 20 may also have a four-stage or higher telescoping design.

(B) In the above embodiment, the cam grooves b were formed on one of two frames, and the cam protrusions B were formed on the other frame, but this is not the only option. The cam protrusions B may be formed on one of two frames, and the cam grooves b formed on the other frame. Also, the cam grooves b and the cam protrusions B may be formed on each of two frames.

(C) In the above embodiment, the rectilinear grooves a were formed on one of two frames, and the rectilinear protrusions A were formed on the other frame, but this is not the only option. The rectilinear protrusions A may be formed on one of two frames, and the rectilinear grooves a formed on the other frame. Also, the rectilinear grooves a and the rectilinear protrusions A may be formed on each of two frames.

(D) In the above embodiment, the bayonet grooves e were formed on one of two frames, and the bayonet protrusions E were formed on the other frame, but this is not the only option. The bayonet protrusions E may be formed on one of two frames, and the bayonet grooves e formed on the other frame. Also, the bayonet grooves e and the bayonet protrusions E may be formed on each of two frames.

(E) In the above embodiment, the third lens group frame 330 was retracted toward the second lens group frame 320 in the retracted state, but this is not the only option. The third lens group frame 330 may be disposed to the rear of the second lens group frame 320 in the refracted state.

(F) In the above embodiment, the description focused on a cam mechanism of the second lens group frame 320 and the shutter frame 335 engaged with the second rotary frame 220, but this is not the only option. The configuration of the above-mentioned cam mechanism can be applied to one cam frame and two frames that are engaged with said cam frame.

(G) The cam grooves b4 and b5 were formed in the inner peripheral face 220S of the second rotary frame 220, the cam protrusions B5 were formed in the outer peripheral face 335T of the shutter frame 335, and the cam protrusions B4 were formed in the outer peripheral face 320T of the second lens group frame 320, but this is not the only option. If the shutter frame 335 and the second lens group frame 320 are disposed on the outside of the second rotary frame, then the cam grooves b4 and b5 may be formed in the outer peripheral face 220T of the second rotary frame 220, the cam protrusions B5 may be formed in the inner peripheral face 335S of the shutter frame 335, and the cam protrusions B4 may be formed in the inner peripheral face 320S of the second lens group frame 320.

(H) In the above embodiment, a case was described in which only the cam grooves b4 and b5 of the second rotary frame 220 were formed, and the two intersected, but this is not the only option. Three or more kinds of cam groove may be formed in the second rotary frame 220, and these may intersect at four or more places.

(I) In the above embodiment, the second direction of the cam grooves b4 of the second rotary frame 220 was described as the peripheral direction, but this is not the only option. The second direction of the cam grooves b4 may also be a direction that intersects the peripheral direction. In this case, the cam protrusions B4 should have the same shape as the cam protrusions B5.

(J) In the above embodiment, the width of the cam grooves was not constant with respect to the radial direction, that is, the cam faces were at an angle to the direction perpendicular to the optical axis. That is, the cam faces result in a tapered cam, but it is not important how the cam faces are formed. For example, the cam faces may be formed so that the angle is 0° to the direction perpendicular to the optical axis. In this case, the cam contact faces of the cam protrusions become cylindrical faces. The cam protrusions may have a shape in which two cylindrical faces are aligned and spaced apart in the first direction. The spacing of the two cylindrical faces should be greater than the length of the first cam grooves in the width direction. Here again, the same effect as above can be obtained.

(K) In the above embodiment, the shape of the cam protrusions was such that two cones were aligned and spaced apart, but this is not the only option. The shape of the cam protrusions may be such that two rotating bodies are aligned and spaced apart. The cam faces of the cam grooves may have a cross sectional shape corresponding to these rotating bodies. In this case, the space of the two rotating bodies should be greater than the length of the first cam grooves in the width direction. Here again, the same effect as above can be obtained.

(L) In the above embodiment, the radial direction depth of the two bayonet grooves e3 was set shallower than the radial direction depth of the cam grooves b5, but this is not the only option. The radial direction depth of the two bayonet grooves e3 may be deeper than the radial direction depth of the cam grooves b5. As shown in FIG. 18, the cam grooves b5 and the bayonet grooves e3 intersect in the intersection region 46. If the cam protrusions B5 are small in size when the cam protrusions B5 cross the bayonet grooves e3, there is the risk that the cam protrusions B5 snags on the bayonet grooves e3. The length α1 of the cam protrusions B5 in the first direction is greater than the length α3 of the bayonet grooves e3 in the first direction. Therefore, the cam protrusions B5 can smoothly cross the bayonet grooves e3. If the bayonet protrusions E3 are small in size when the bayonet protrusions E3 cross the first straight line parts b51, there is the risk that the bayonet protrusions E3 snags on the first straight line parts b51. The length of the bayonet protrusions E3 in the second direction should be greater than the length β2 of the first straight line parts b51 in the second direction. If it is, then the bayonet protrusions E3 can smoothly cross the first straight line parts b51.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present technology should be interpreted relative to the lens barrel.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

The technology disclosed herein provides a lens barrel that can be made more compact, and therefore can be applied, for example, to cameras, portable telephones with a camera function, portable terminals with a camera function, and so forth.

What is claimed is:
1. A lens barrel, comprising:
a first frame including at least one first cam groove and at least one second cam groove, the at least one the first cam groove provided along a cylindrical face and including a first straight portion, the first straight portion formed in a first direction in a state in which the cylindrical face is spread out in a plane, the at least one second cam groove provided along the cylindrical face, formed in a second direction that intersects the first direction in a state in which the cylindrical face is spread out in a plane, and including a second straight portion that intersects the first straight portion;

a second frame including at least one first cam protrusion, the at least one first cam protrusion configured to engage with the first cam groove; and a third frame including at least one second cam protrusion, the at least one second cam protrusion configured to engage with the second cam groove, the length of the first cam protrusion in the first direction is greater than the length of the second straight portion in the first direction, and the length of the second cam protrusion in the second direction is greater than the length of the first straight portion in the second direction.

2. The lens barrel according to claim 1, wherein the first cam groove includes first and second cam faces, the two end faces of the first cam protrusion coming into contact with the first and second cam faces.

3. The lens barrel according to claim 1, wherein the depth of the first cam groove is substantially the same as the depth of the second cam groove.

4. The lens barrel according to claim 1, wherein the two end faces of the first cam protrusion in the first direction are cylindrical surfaces, conical surfaces, or partial spherical surfaces, axes of the cylindrical surfaces and the conical surfaces extending in the radial direction of the first frame, a center of the spherical surfaces is on a line extending in the radial direction of the first frame.

5. The lens barrel according to claim 4, wherein the first cam protrusion is formed on the second frame so that the length of the first cam protrusion in the first direction is greater than the length of the first cam protrusion in a width direction of the cam groove.

6. The lens barrel according to claim 1, wherein the first cam protrusion is formed on the second frame so that the length of the first cam protrusion in the first direction is greater than the length of the first cam protrusion in a width direction of the cam groove.

7. The lens barrel according to claim 6, wherein the first cam protrusion is formed on the second frame so that an angle is greater than 0 degrees, the angle being formed by a straight line on the cylindrical face parallel to the center axis of the cylinder, and the first direction of the first cam protrusion.

* * * * *